US012486227B2

United States Patent
Bannister et al.

(10) Patent No.: US 12,486,227 B2
(45) Date of Patent: Dec. 2, 2025

(54) SMALL MOLECULES FOR CANCER THERAPY THAT REDUCE THE EXPRESSION OF TRANSCRIPTION FACTORS KLF5 AND EGR-1

(71) Applicants: University of Florida Research Foundation, Incorporated, Gainesville, FL (US); The Research Foundation for The State University of New York, Albany, NY (US)

(72) Inventors: Thomas D. Bannister, Palm Beach Gardens, FL (US); Chao Wang, Palm Beach Gardens, FL (US); Agnieszka B. Bialkowska, East Setauket, NY (US); Vincent W. Yang, East Setauket, NY (US)

(73) Assignees: University of Florida Research Foundation, Incorporated, Gainesville, FL (US); The Research Foundation for The State University of New York, Albany, NY (US)

( * ) Notice: Subject to any disclaimer, the term of this patent is extended or adjusted under 35 U.S.C. 154(b) by 1052 days.

(21) Appl. No.: 17/602,924

(22) PCT Filed: Apr. 10, 2020

(86) PCT No.: PCT/US2020/027716
§ 371 (c)(1),
(2) Date: Oct. 11, 2021

(87) PCT Pub. No.: WO2020/210662
PCT Pub. Date: Oct. 15, 2020

(65) Prior Publication Data
US 2022/0177425 A1    Jun. 9, 2022

Related U.S. Application Data

(60) Provisional application No. 62/832,654, filed on Apr. 11, 2019.

(51) Int. Cl.
C07D 207/09    (2006.01)
A61P 35/00     (2006.01)
(Continued)

(52) U.S. Cl.
CPC ............ *C07D 207/09* (2013.01); *A61P 35/00* (2018.01); *C07D 207/48* (2013.01);
(Continued)

(58) Field of Classification Search
CPC ..... A61P 35/00; C07D 207/09; C07D 207/48; C07D 211/28; C07D 211/96; C07D 243/08; C07D 295/26
See application file for complete search history.

(56) References Cited

FOREIGN PATENT DOCUMENTS

WO    WO 2014/018859 A1    1/2014

OTHER PUBLICATIONS

Kim et al., SR-18662: A Potent Colorectal Cancer Growth Inhibitor, AGA Abstracts, vol. 152, No. 5, Supplement 1, S41, Apr. 2017 (Year: 2017).*

(Continued)

*Primary Examiner* — Sarah Pihonak
*Assistant Examiner* — Padmaja S Rao
(74) *Attorney, Agent, or Firm* — Wolf, Greenfield & Sacks, P.C.

(57) ABSTRACT

The present disclosure provides compounds of formula (I), as described herein, their pharmaceutically acceptable salts, and their pharmaceutical compositions, which are effective in reducing the expression level of KLF5 or EGR1 in a living cell, and for the treatment of tumors and colorectal cancer in a human patient.

15 Claims, 6 Drawing Sheets

(51) Int. Cl.
  *C07D 207/48* (2006.01)
  *C07D 211/28* (2006.01)
  *C07D 211/96* (2006.01)
  *C07D 243/08* (2006.01)
  *C07D 295/26* (2006.01)

(52) U.S. Cl.
  CPC .......... *C07D 211/28* (2013.01); *C07D 211/96* (2013.01); *C07D 243/08* (2013.01); *C07D 295/26* (2013.01)

(56) References Cited

OTHER PUBLICATIONS

Croasdell, Digestive Disease Week 2017, Chicago, Illinois, USA—May 6-9, 2017, Drugs of the Future, vol. 42, No. 6, 377-380, 2017 (Year: 2017).*
International Search Report and Written Opinion for International App. No. PCT/US2020/027716, mailed Jun. 5, 2020.
International Preliminary Report on Patentability (Chapter I) for International App. No. PCT/US2020/027716, mailed Oct. 21, 2021.
Bialkowska et al., Identification of novel small-molecule compounds that inhibit the proproliferative Kruppel-like factor 5 in colorectal cancer cells by high-throughput screening. Mol Cancer Ther. Mar. 2009;8(3):563-70. doi: 10.1158/1535-7163.MCT-08-0767. Epub Feb. 24, 2009.
Bialkowska et al., Identification of small-molecule inhibitors of the colorectal cancer oncogene Krüppel-like factor 5 expression by ultrahigh-throughput screening. Mol Cancer Ther. Nov. 2011;10(11):2043-51. doi: 10.1158/1535-7163.MCT-11-0550. Epub Sep. 1, 2011.
Bialkowska et al., ML264: An Antitumor Agent that Potently and Selectively Inhibits Krüppel-like Factor Five (KLF5) Expression: A Probe for Studying Colon Cancer Development and Progression. Oct. 31, 2011 [updated Mar. 7, 2013]. In: Probe Reports from the NIH Molecular Libraries Program [Internet]. Bethesda (MD): National Center for Biotechnology Information (US); 2010.
Chen et al., YD277 Suppresses Triple-Negative Breast Cancer Partially Through Activating the Endoplasmic Reticulum Stress Pathway. Theranostics. Jun. 11, 2017;7(8):2339-2349. doi: 10.7150/thno.17555. PMID: 28740556; PMCID: PMC5505065.
Kim et al., The Novel Small-Molecule SR18662 Efficiently Inhibits the Growth of Colorectal Cancer In Vitro and In Vivo. Mol Cancer Ther. Nov. 2019;18(11):1973-1984. doi: 10.1158/1535-7163.MCT-18-1366. Epub Jul. 29, 2019.
Ruiz De Sabando et al., ML264, A Novel Small-Molecule Compound That Potently Inhibits Growth of Colorectal Cancer. Mol Cancer Ther. Jan. 2016;15(1):72-83. doi: 10.1158/1535-7163.MCT-15-0600. Epub Nov. 30, 2015. PMID: 26621868; PMCID: PMC4707060.

* cited by examiner

A ML264

DLD-1 IC$_{50}$: 1.302 e-08
HCT116 IC$_{50}$: 3.442 e-08
HT29 IC$_{50}$: 2.953 e-07
SW620 IC$_{50}$: 4.126 e-07

B SR15006

DLD-1 IC$_{50}$: 1.633 e-08
HCT116 IC$_{50}$: 7.469 e-08
HT29 IC$_{50}$: 2.841 e-07
SW620 IC$_{50}$: 2.623 e-07

C SR18662

DLD-1 IC$_{50}$: 1.684 e-09
HCT116 IC$_{50}$: 2.219 e-08
HT29 IC$_{50}$: 4.024 e-08
SW620 IC$_{50}$: 2.260 e-08

SMALL MOLECULES FOR CANCER THERAPY THAT REDUCE THE EXPRESSION OF TRANSCRIPTION FACTORS KLF5 AND EGR-1

RELATED APPLICATIONS

The present application claims the benefit of priority to U.S. Provisional Patent Application No. 62/832,654, filed on Apr. 11, 2019, and which application is incorporated by reference as if fully set forth herein.

STATEMENT OF GOVERNMENT SUPPORT

This invention was made with government support under grant numbers DA026215, CA172113, DK052230, and MH084512 awarded by The National Institutes of Health. The government has certain rights in the invention.

BACKGROUND

Colorectal cancer (CRC) is the third most commonly diagnosed cancer and the third leading cause of cancer-related death in US, in both men and women (1). Current approaches for treatment of CRC include surgery, radiation-, chemo-, immuno-, and targeted therapy (2). Standard chemotherapy treatments lead to the inhibition of DNA synthesis and transcription, available targeted therapies block the function of VEGF, EGFR or other kinases (3), and immunotherapy targets PLD-1 and CTLA-4 on T cells (4). These treatments are often used in combination for advanced stages of CRC, produce multiple side effects, and in some cases are ineffective due to specific mutations acquired during cancer progression. It has been shown that colorectal cancer development and progression results from impairments of function of signaling pathways (5), particularly the WNT and KRAS signaling pathways, which are affected even in the early stages (5). Specifically targeting these pathways would be an intriguing approach, though no compounds known to act in this manner have successfully progressed through (or even into) clinical trials (6).

Krüppel-like factor 5 (KLF5) is zinc finger transcription factor that has been shown to play a pro-proliferative role in many tissues (7-10). Studies have demonstrated that KLF5 is highly expressed in the intestinal epithelium within the transit-amplifying zone of crypts and in the active intestinal stem cells (11-13). We and others have shown that KLF5 is modulated downstream from the MAPK, WNT, and PI3K signaling pathways, although is regulated by them in different ways, and moreover KLF5 also mediates the function of many components of these pathways by unidentified feedback mechanisms (8, 14, 15). KLF5 plays a very important role during colorectal cancer development and progression. Studies showed that the deletion of K5 from active intestinal cancer stem cells expressing the Leucine Rich Repeat Containing G Protein-Coupled Receptor 5 (Lgr5) and bearing an activating Ctnnb1 mutation prevents formation of colorectal tumors (13). KLF5 in conjunction with YAP1 also ensures the renewal of colon cancer progenitor cells (16). Moreover, data from our laboratory demonstrated that the deletion of one copy of the Klf5 gene in the context of an Apc$^{Min/+}$ mutation or with combination of Apc$^{Min/+}$ and KRAS$^{V12G}$ mutations in mice significantly reduces development of intestinal polyps (17-19). A recent publication by Zhang and colleagues demonstrated that KLF5 undergoes diverse types of genomic alterations during cancer development that activate its oncogenic properties (20).

We previously developed a luciferase assay to screen for compounds that inhibit the activity of the human KLF5 promoter (21, 22). Following HTS and structure-activity relationship studies we identified a small molecule lead, ML264, and showed that it is efficacious in CRC cell growth inhibition assays, both in vitro and in vivo (23, 24). See published PCT application WO2014/018859, the disclosure of which is incorporated by reference herein in its entirety.

SUMMARY

The present disclosure relates, in one embodiment, to a new small molecule lead, designated SR18662, that efficiently inhibits the growth of CRC cells both in vitro and in vivo and that reduces the expression levels of both KLF5 and EGR1.

The present disclosure also provides, in various embodiments, a compound of formula (I), or a pharmaceutically acceptable salt thereof:

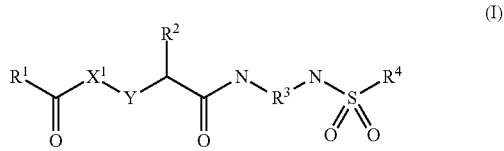

(I)

wherein $X^1$ is selected from the group consisting of NH, $CH_2$, CH-alkyl, and N-alkyl;

Y is selected from the group consisting of $CH_2$, CH-alkyl, and a bond;

$R^1$ is of formula

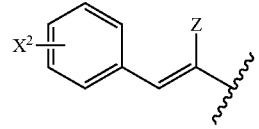

wherein $X^2$ is selected from the group consisting of H and 1-3 independent instances of Cl, Br, I, F, $SO_2NH_2$, $SO_2N(Me)_2$, $SO_2NH$-alkyl (such as $SO_2NHMe$), $SO_2Me$, (C=O)$NH_2$, (C=O)NHMe, (C=O)$NMe_2$, (C=O)NH-alkyl, O-alkyl (such as OMe), and SMe;

Z is selected from the group consisting of H, CN, $CF_3$, $SO_2Me$, $SO_2NH_2$, $SO_2NH$-alkyl (such as $SO_2NHMe$), $SO_2N(alkyl)_2$ (wherein the alkyl groups and the nitrogen atom to which they are bonded optionally form a ring further comprising 0 or 1 heteroatoms selected from the group consisting of O, S, NH, and N-alkyl (such as NMe)), C(O)Me, $CO_2$-alkyl (such as $CO_2Me$), C(O)—NH-alkyl, and C(O)N(Me)-alkyl;

$R^2$ is selected from the group consisting of H, alkyl (such as Me), and a side chain group of a natural amino acid;

$R^3$ and the nitrogen atoms to which it is attached together comprise a cyclic or acyclic diamine of any one of the following formulae

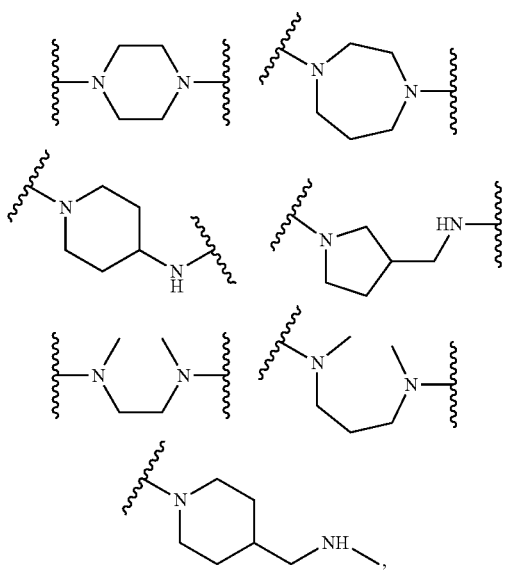

wherein a wavy line indicates a position of bonding; and,

R⁴ is alkyl, such as methyl, ethyl, other lower alkyl, including branched alkyls.

The present disclosure also provides in various embodiments a compound of formula (II)

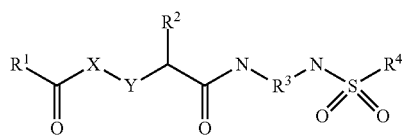

wherein
$X^1$ is NH or N-alkyl;
Y is $CH_2$ or is absent (a bond);
$R^1$ is of formula

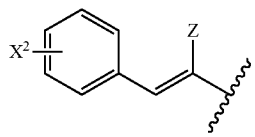

wherein
$X^2$ is selected from the group consisting of H or 1-2 independent instances of Cl, Br, F, $SO_2N(Me)_2$, $SO_2NH$-alkyl (such as $SO_2NHMe$), $SO_2Me$, (C=O)NHMe, (C=O)NMe₂, (C=O)NH-alkyl, and O-alkyl (such as OMe);
Z is selected from the group consisting of H, CN, $CF_3$, $SO_2Me$, $SO_2NH$-alkyl (such as $SO_2NHMe$), $SO_2N$(alkyl)₂ (wherein the alkyl groups and the nitrogen atom to which they are bonded can optionally form a ring further comprising 0 or 1 heteroatoms selected from the group consisting of O, NH, and N-alkyl (such as NMe)), C(O)Me, C(O)—NH-alkyl, or C(O)N(Me)-alkyl;
$R^2$ is selected from the group consisting of H, Me, alkyl, and a side chain group of a natural amino acid;

$R^3$ and the nitrogen atoms to which it is attached together comprise a cyclic diamine of any one of the following formulae:

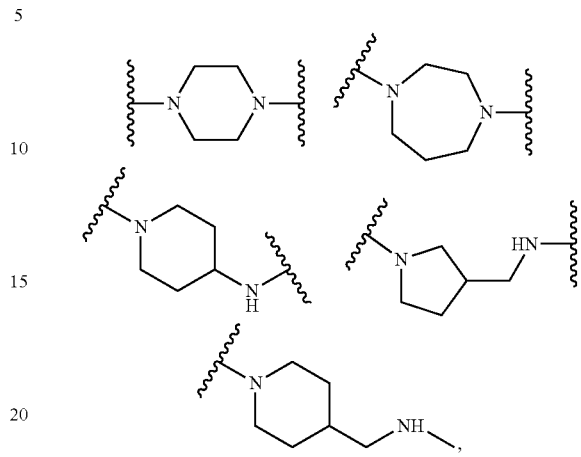

wherein a wavy line indicates a position of bonding; and, $R^4$ is methyl, ethyl, other lower alkyl, including branched alkyls.

In additional embodiments, the compound is selected from any one of Examples 1-18 as disclosed herein.

In an embodiment, the compound is of formula SR18662 ((L)-3-(3,4-dichlorophenyl)-N-(2-(4-(methylsulfonyl)piperazin-1-yl)-2-oxoethyl)acrylamide)

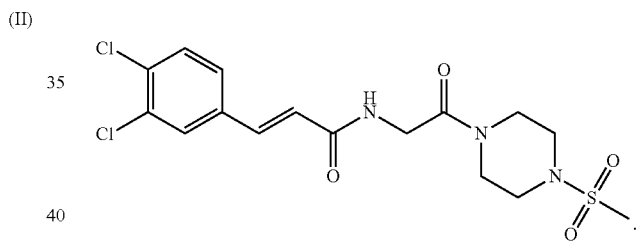

Another embodiment of the present disclosure is a method of reducing an expression level of KLF5 in a living cell, comprising contacting the cell with an effective amount or concentration of a compound as disclosed herein.

In another embodiment, the present disclosure provides a method of treatment of tumors in mammals that are comprised of KLF5-expressing cancer cells. The method comprises administering to the patient an effective dose of a compound as disclosed herein.

Still another embodiment of the present disclosure is a method of treatment of colorectal cancer in a human patient. The method comprises administering to the patient an effective dose of a compound as disclosed herein.

The present disclosure provides in another embodiment a pharmaceutical composition comprising a compound as disclosed herein and a pharmaceutically acceptable carrier.

DETAILED DESCRIPTION

The compounds of formula (I) or their pharmaceutically acceptable salts disclosed herein are exemplified, in an embodiment, by the new lead compound designated herein as SR18662 that exhibits a higher efficacy for CRC cell growth inhibition in vitro. Several structural analogs are also active, as illustrated by additional embodiments relating to compounds 1-18. Moreover, SR18662 significantly reduces the growth of tumors in a mouse xenograft model, and it efficiently inhibits the growth of colorectal cancer in vitro and in vivo.

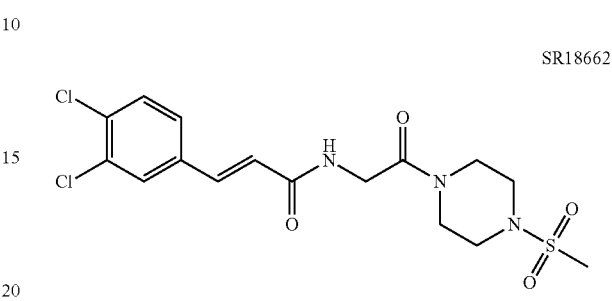

SR18662

Figure 1:
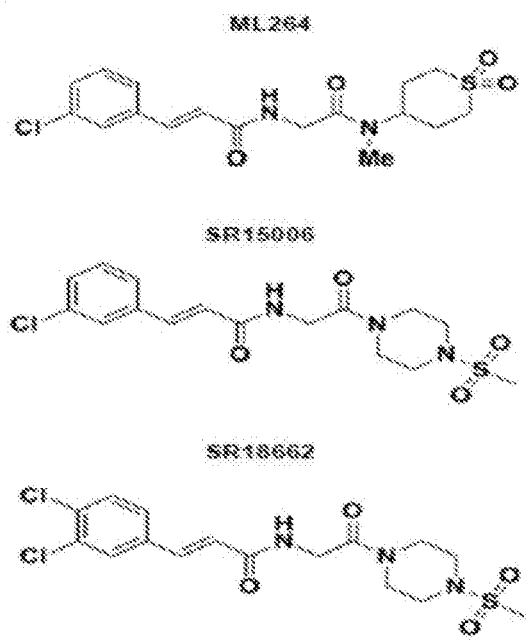
FIG. 1. SR18662 induces anti-tumor activity in colorectal cancer cell lines. (A) Chemical structures of ML264, SRI5006, and SR18662. (B) Percentage of the human KLF5 promoter activity as measured by a luciferase assay in the DLD-1/pGL4.18hKLF5p cell line upon ML264, SR15006, and SR18662 24 h treatment. ---- lines represent ML264, ●●●● lines—SR15006, and -●●-●● lines—SR18662, (C-D) Proliferation assays of DLD-1 (C) and HCT116 (D) cells treated with DMSO or with 10 µM ML264, SR15006, or SR18662 at 24, 48 and 72 h. The solid lines represent control (DMSO-treated), ---- lines—ML264, ●●●● lines—SR15006, and -●●-●● lines—SR18662. Data represent mean±SEM (n=3). *p<0.05, ***p<0.001, (E-F) Percentage cell growth of DLD-1 (E) and HCT116 (F) cells treated with DMSO or 10 µM ML264 or SR15006 or SR18662 at 24, 48 and 72 h. Data represent mean±SEM (n=3). *p<0.05, p<0.01, *p<0.001.
Figure 1:
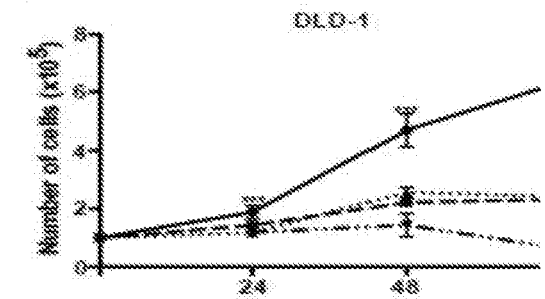
Figure 1:
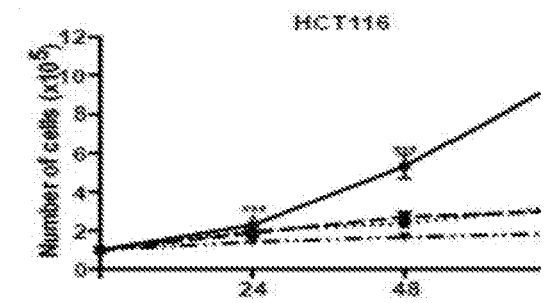
Figure 1:
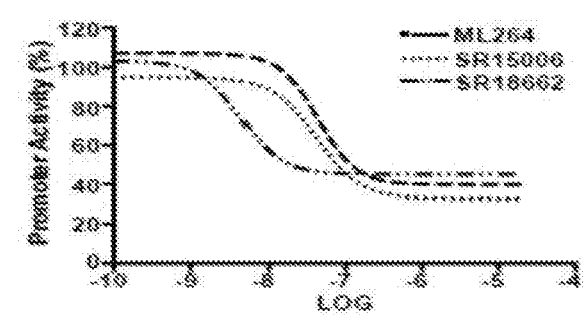
Figure 1:
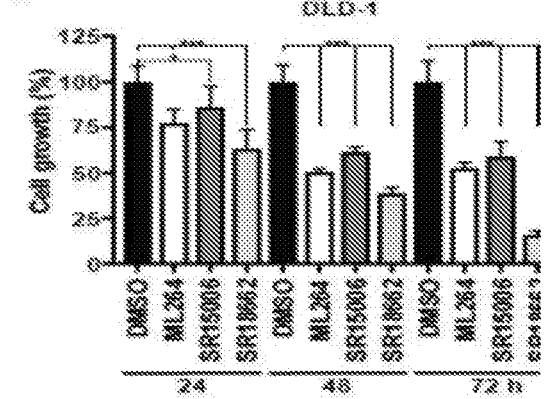
Figure 1:
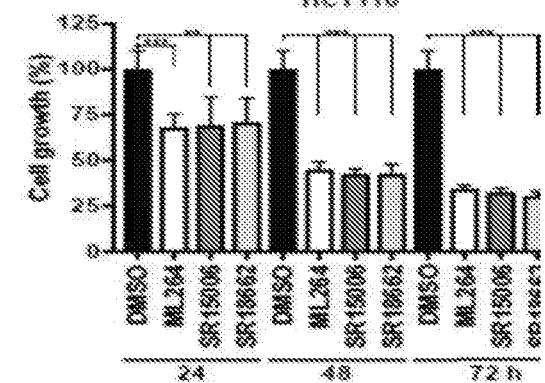
Figure 2:
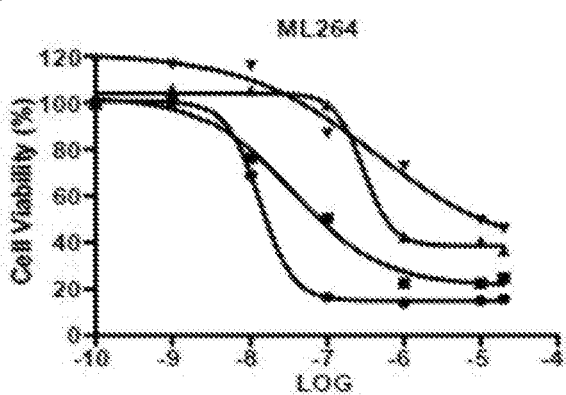
FIG. 2. ML264, SR15006, and SR18662 inhibit viability of multiple colorectal cancer cell lines. Percentage cell viability of colorectal cancer cell lines treated with ML264 (A), SR15006 (B), or SR18662 (C). Cells were treated with test compounds for 24 h and cell viability was measured using Cell Titer Glo. Each experiment was performed in triplicate and data is shown as mean±SEM (n=3). ● represents DLD-1, □—HCT116, ▲—HT29, and ▼—SW620 cell line (all compound concentrations in mol/L).
Figure 2:
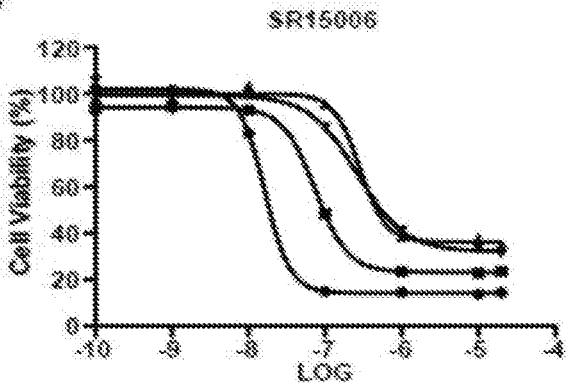
Figure 2:
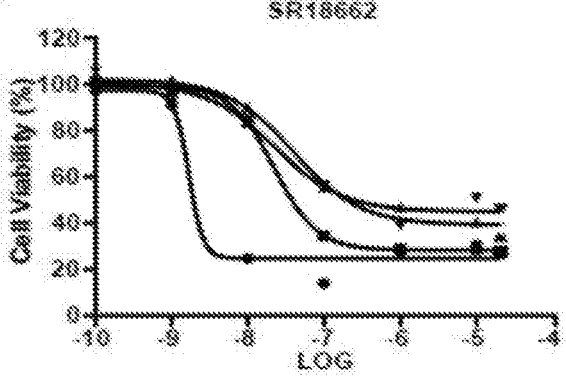
Figure 3:
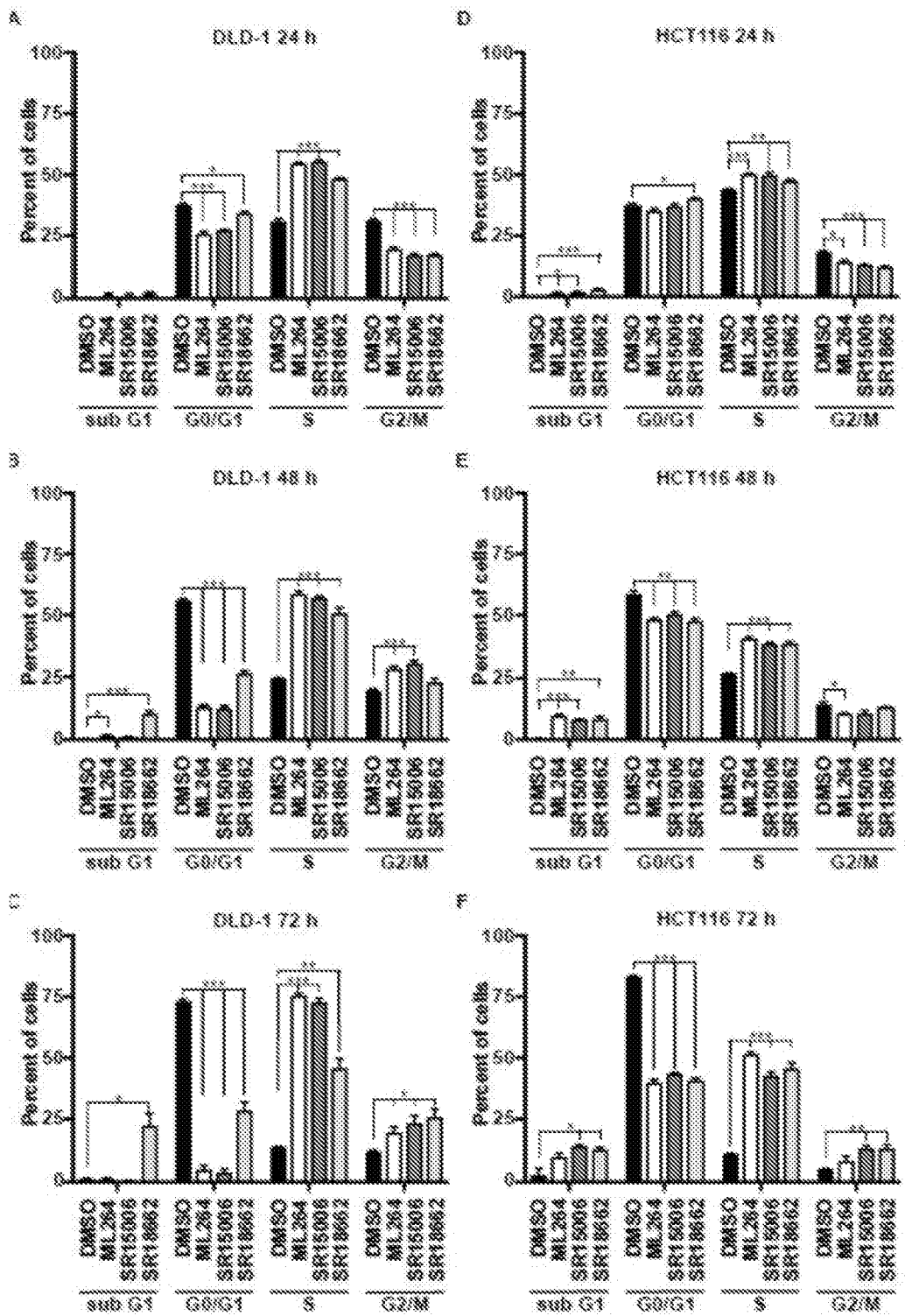
FIG. 3. SR18662 changes cell cycle profiles of colorectal cancer cell lines. DLD-1 and HCT116 cells were treated with DMSO or 10 µM ML264, SR15006, or SR18662 for 24 (A and D), 48 (B and E) and 72 h (C and F), respectively, stained with propidium iodide, and analyzed by flow cytometry. Each experiment was performed in triplicate and data is shown as mean t SEM (n=3). *p<0.05, p<0.01, *p<0.001.
Figure 4:
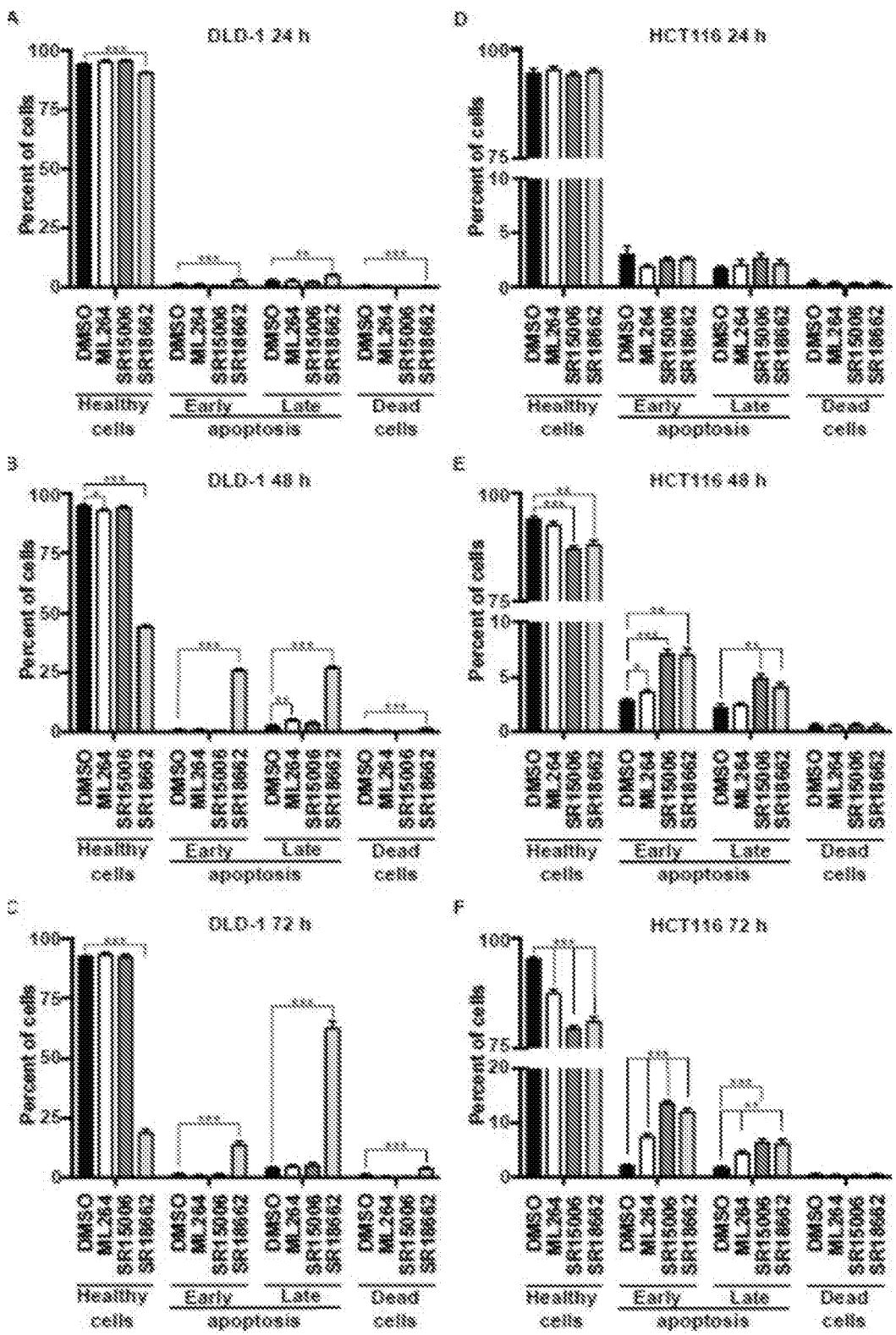
FIG. 4. SR18662 increases apoptosis of colorectal cancer cell lines. DLD-1 and HCT116 cells were treated with DMSO or 10 µM ML264, SR15006, or SR18662 for 24 (A and D), 48 (B and E) and 72 h (C and F), respectively, and the apoptosis rate was determined using the Alexa Fluor 488 Annexin V/Dead Cell Apoptosis Kit analyzed by flow cytometry. Each experiment was performed in triplicate and data is shown as mean±SEM (n=3). *p<0.05, p<0.01, *p<0.001.

In the present disclosure, formula (I) compounds as exemplified by SR18662 show superior efficacy in the inhibition of CRC cell proliferation in vitro and in vivo. SR18662 more efficiently reduces proliferation of CRC cells in comparison to vehicle-treated cells but also showed significant improvement over treatment with either ML264 or SR15006 (FIGS. 1 and 2). This enhanced ability to prevent CRC cell proliferation was shown in both microsatellite instable (DLD-1 and HCT116) and microsatellite stable (HT29 and SW620) cell types (42). Moreover, these cell lines have different genomic alterations of KRAS, BRAF, PIK3CA or TP53, supporting the effective use of SR18662 against a broad spectrum of CRC cells (42). Furthermore, the increased ability of SR18662 to inhibit growth of CRC cells, as compared to ML264 and SR15006, was accompanied by more potent inhibition of the activity of human KLF5 promoter. In contrast to ML264 and SRI5006, SR18662 not only modified the progression of cell cycle but also induced apoptosis and death in CRC cells (FIGS. 3 and 4). Treatment of CRC cells with all three compounds led to reduced expression of the components of MAPK and WNT signaling pathways and to a reduction in cyclin levels, but the effect of SR18662 is more pronounced at 1 µM and 10 µM over the three day time course. Furthermore, levels of EGR1, a direct transcriptional activator of KLF5, were significantly reduced, with effects notable even at early time points following treatment with SRI8662, an effect that was less pronounced following treatment with either ML264 or SR15006. This more rapid onset of activity is an advantage of SR18662 over its predecessors. Moreover, the potent activity of SR18662 from in vitro studies translated to an in vivo colorectal cancer xenograft model. While ML264 significantly reduced the growth of the CRC xenografts in the mouse model upon treatment once a day with concentration of 25 mg/kg, SR18662 showed strong inhibitory effects with treatment once a day with 10 mg/kg. A further advantage is that SR18662 does not inhibit the major human CYP450 liver enzymes and is orally bioavailable in mice.

Definitions

The term "alkyl" refers to a straight or branched chain hydrocarbyl including from 1 to about 20 carbon atoms. For instance, an alkyl, variously referred to as "lower alkyl," can have from 1 to 10 carbon atoms or 1 to 6 carbon atoms. Exemplary alkyl includes straight chain alkyl groups such as methyl, ethyl, propyl, butyl, pentyl, hexyl, heptyl, octyl, nonyl, decyl, undecyl, dodecyl, and the like, and also includes branched chain isomers of straight chain alkyl groups, for example without limitation, —CH(CH$_3$)$_2$, —CH(CH$_3$)(CH$_2$CH$_3$), —CH(CH$_2$CH$_3$)$_2$, —C(CH$_3$)$_3$, —C(CH$_2$CH$_3$)$_3$, —CH$_2$CH(CH$_3$)$_2$, —CH$_2$CH(CH$_3$)(CH$_2$CH$_3$), —CH$_2$CH(CH$_2$CH$_3$)$_2$, —CH$_2$C(CH$_3$)$_3$, —CH$_2$C(CH$_2$CH$_3$)$_3$, —CH(CH$_3$)CH(CH$_3$)(CH$_2$CH$_3$), —CH$_2$CH$_2$CH(CH$_3$)$_2$, —CH 2CH$_2$CH(CH$_3$)(CH$_2$CH$_3$), —CH$_2$CH$_2$CH(CH$_2$CH$_3$)$_2$, —CH$_2$CH$_2$C(CH$_3$)$_3$, —CH$_2$CH$_2$C(CH$_2$CH$_3$)$_3$, —CH(CH$_3$)CH$_2$CH(CH$_3$)$_2$, —CH(CH$_3$)CH(CH$_3$)CH(CH$_3$)$_2$, and the like. Thus, alkyl groups include primary alkyl groups, secondary alkyl groups, and tertiary alkyl groups.

A "natural amino acid" as used herein refers to any naturally occurring amino acid. For example, the natural amino acid contemplates any of the amino acids found in the genetic code, including alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine.

Compounds described herein can exist in various isomeric forms, including configurational, geometric, and conformational isomers, including, for example, cis- or trans-conformations. The compounds may also exist in one or more tautomeric forms, including both single tautomers and mixtures of tautomers. The term "isomer" is intended to encompass all isomeric forms of a compound of this disclosure, including tautomeric forms of the compound. The compounds of the present disclosure may also exist in open-chain or cyclized forms. In some cases, one or more of the cyclized forms may result from the loss of water. The specific composition of the open-chain and cyclized forms may be dependent on how the compound is isolated, stored or administered. For example, the compound may exist primarily in an open-chained form under acidic conditions but cyclize under neutral conditions. All forms are included in the disclosure.

Some compounds described herein can have asymmetric centers and therefore exist in different enantiomeric and diastereomeric forms. A compound as described herein can be in the form of an optical isomer or a diastereomer. Accordingly, the disclosure encompasses compounds and their uses as described herein in the form of their optical isomers, diastereoisomers and mixtures thereof, including a racemic mixture. Optical isomers of the compounds of the disclosure can be obtained by known techniques such as asymmetric synthesis, chiral chromatography, simulated moving bed technology or via chemical separation of stereoisomers through the employment of optically active resolving agents.

Unless otherwise indicated, the term "stereoisomer" means one stereoisomer of a compound that is substantially free of other stereoisomers of that compound. Thus, a stereomerically pure compound having one chiral center will be substantially free of the opposite enantiomer of the compound. A stereomerically pure compound having two chiral centers will be substantially free of other diastereomers of the compound. A typical stereomerically pure compound comprises greater than about 80% by weight of one stereoisomer of the compound and less than about 20% by weight of other stereoisomers of the compound, for example greater than about 90% by weight of one stereoisomer of the compound and less than about 10% by weight of the other stereoisomers of the compound, or greater than about 95% by weight of one stereoisomer of the compound and less than about 5% by weight of the other stereoisomers of the compound, or greater than about 97% by weight of one stereoisomer of the compound and less than about 3% by weight of the other stereoisomers of the compound, or greater than about 99% by weight of one stereoisomer of the compound and less than about 1% by weight of the other stereoisomers of the compound. The stereoisomer as described above can be viewed as composition comprising two stereoisomers that are present in their respective weight percentages described herein.

If there is a discrepancy between a depicted structure and a name given to that structure, then the depicted structure controls. Additionally, if the stereochemistry of a structure or a portion of a structure is not indicated with, for example, bold or dashed lines, the structure or portion of the structure is to be interpreted as encompassing all stereoisomers of it. In some cases, however, where more than one chiral center exists, the structures and names may be represented as single enantiomers to help describe the relative stereochemistry. Those skilled in the art of organic synthesis will know if the compounds are prepared as single enantiomers from the methods used to prepare them.

As used herein, and unless otherwise specified to the contrary, the term "compound" is inclusive in that it encompasses a compound or a pharmaceutically acceptable salt, stereoisomer, and/or tautomer thereof. Thus, for instance, a compound of Formula IA or Formula IB includes a pharmaceutically acceptable salt of a tautomer of the compound.

In this disclosure, a "pharmaceutically acceptable salt" is a pharmaceutically acceptable, organic or inorganic acid or base salt of a compound described herein. Representative pharmaceutically acceptable salts include, e.g., alkali metal salts, alkali earth salts, ammonium salts, water-soluble and water-insoluble salts, such as the acetate, amsonate (4,4-diaminostilbene-2,2-disulfonate), benzenesulfonate, benzonate, bicarbonate, bisulfate, bitartrate, borate, bromide, butyrate, calcium, calcium edetate, camsylate, carbonate, chloride, citrate, clavulariate, dihydrochloride, edetate, edisylate, estolate, esylate, fiunarate, gluceptate, gluconate, glutamate, glycollylarsanilate, hexafluorophosphate, hexylresorcinate, hydrabamine, hydrobromide, hydrochloride, hydroxynaphthoate, iodide, isothionate, lactate, lactobionate, laurate, malate, maleate, mandelate, mesylate, methylbromide, methylnitrate, methylsulfate, mucate, napsylate, nitrate, N-methylglucamine ammonium salt, 3-hydroxy-2-naphthoate, oleate, oxalate, palmitate, pamoate (1,1-methene-bis-2-hydroxy-3-naphthoate, einbonate), pantothenate, phosphate/diphosphate, picrate, polygalacturonate, propionate, p-toluenesulfonate, salicylate, stearate, subacetate, succinate, sulfate, sulfosaliculate, suramate, tannate, tartrate, teoclate, tosylate, triethiodide, and valerate salts. A pharmaceutically acceptable salt can have more than one charged atom in its structure. In this instance the pharmaceutically acceptable salt can have multiple counterions. Thus, a pharmaceutically acceptable salt can have one or more charged atoms and/or one or more counterions.

The terms "treat", "treating" and "treatment" refer to the amelioration or eradication of a disease or symptoms associated with a disease. In various embodiments, the terms refer to minimizing the spread or worsening of the disease resulting from the administration of one or more prophylactic or therapeutic compounds described herein to a patient with such a disease.

The terms "prevent," "preventing," and "prevention" refer to the prevention of the onset, recurrence, or spread of the disease in a patient resulting from the administration of a compound described herein.

The term "effective amount" refers to an amount of a compound as described herein or other active ingredient sufficient to provide a therapeutic or prophylactic benefit in the treatment or prevention of a disease or to delay or minimize symptoms associated with a disease. Further, a therapeutically effective amount with respect to a compound as described herein means that amount of therapeutic agent alone, or in combination with other therapies, that provides a therapeutic benefit in the treatment or prevention of a disease. Used in connection with a compound as described herein, the term can encompass an amount that improves overall therapy, reduces or avoids symptoms or causes of disease, or enhances the therapeutic efficacy of or is synergistic with another therapeutic agent.

A "patient" or subject" includes an animal, such as a human, cow, horse, sheep, lamb, pig, chicken, turkey, quail, cat, dog, mouse, rat, rabbit or guinea pig. In accordance with some embodiments, the animal is a mammal such as a non-primate and a primate (e.g., monkey and human). In one embodiment, a patient is a human, such as a human infant, child, adolescent or adult. In the present disclosure, the terms "patient" and "subject" are used interchangeably.

Compounds

The present disclosure provides in various embodiments a compound of formula (I), or a pharmaceutically acceptable salt thereof:

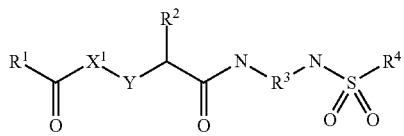

(I)

wherein
$X^1$ is selected from the group consisting of NH, $CH_2$, CH-alkyl, and N-alkyl;
Y is selected from the group consisting of $CH_2$, CH-alkyl, and a bond;
$R^1$ is of formula

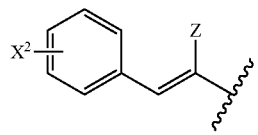

wherein
$X^2$ is selected from the group consisting of H and 1-3 independent instances of Cl, Br, I, F, $SO_2NH_2$, $SO_2N(Me)_2$, $SO_2NH$-alkyl (such as $SO_2NHMe$), $SO_2Me$, (C=O)$NH_2$, (C=O)NHMe, (C=O)$NMe_2$, (C=O)NH-alkyl, O-alkyl (such as OMe), and SMe;
Z is selected from the group consisting of H, CN, $CF_3$, $SO_2Me$, $SO_2NH_2$, $SO_2NH$-alkyl (such as $SO_2NHMe$), $SO_2N$(alkyl)$_2$ (wherein the alkyl groups and the nitrogen atom to which they are bonded optionally form a ring further comprising 0 or 1 heteroatoms selected from the group consisting of O, S, NH, and N-alkyl (such as NMe)), C(O)Me, $CO_2$-alkyl (such as $CO_2Me$), C(O)—NH-alkyl, and C(O)N(Me)-alkyl;

$R^2$ is selected from the group consisting of H, alkyl (such as Me), and a side chain group of a natural amino acid;
$R^3$ and the nitrogen atoms to which it is attached together comprise a cyclic or acyclic diamine of any one of the following formulae

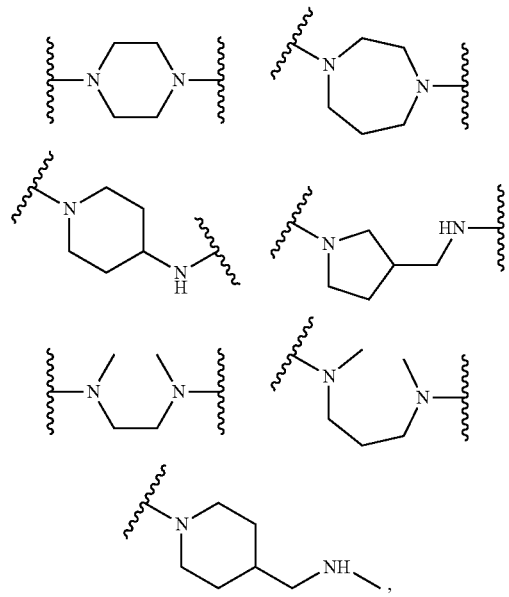

wherein a wavy line indicates a position of bonding; and,
$R^4$ is alkyl, such as methyl, ethyl, other lower alkyl, including branched alkyls.

In various embodiments, $X^1$ is NH or N-alkyl;
Y is $CH_2$ or is a bond;
$R^1$ is of formula

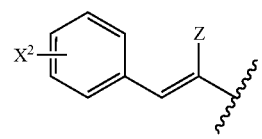

wherein
$X^2$ is selected from the group consisting of H and 1-2 independent instances of F, Cl, Br, $SO_2N(Me)_2$, $SO_2NHMe$, $SO_2NH$-alkyl, $SO_2Me$, (C=O)NHMe, (C=O)$NMe_2$, (C=O)NH-alkyl, and O-alkyl;

Z is selected from the group consisting of H, CN, $CF_3$, $SO_2Me$, $SO_2NH$-alkyl, $SO_2N$(alkyl)$_2$ (wherein the alkyl groups and the nitrogen atom to which they are bonded optionally form a ring further comprising 0 or 1 heteroatoms selected from the group consisting of O, NH, NMe, and N-alkyl), C(O)Me, C(O)—NH-alkyl, and C(O)N(Me)-alkyl; and $R^3$ and the nitrogen atoms to which it is attached together comprise a cyclic diamine of any one of the following formulae:

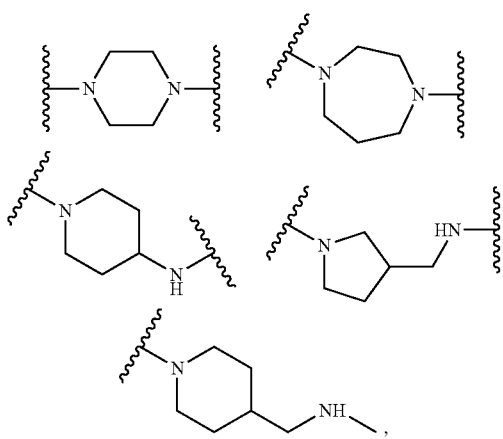

In an embodiment, X is NH. The present disclosure provides in additional embodiments a formula (I) compounds wherein X is NH and $R^2$ is H. In still further embodiments, $X^1$ is NH. $R^2$ is H, and the group N—$R^3$—N is a piperazine ring.

In various embodiments, $X^1$ is NH, $R^2$ is H, the group N—$R^3$—N is a piperazine ring, and $R^4$ is Me. Optionally in combination with these embodiments is another embodiment wherein $X^1$ is one or two instances selected from the group consisting of F, Cl, Me, $CF_3$, and $SO_2Me$.

In various other embodiments, the present disclosure provides a compound enumerated 1-18, or pharmaceutically acceptable salt thereof, as shown in the table below:

| Example | structure |
|---|---|
| 1 | |
| 2 | |
| 3 | |
| 4 | |
| 5 | |

-continued
| Example | structure |
|---|---|
| 6 | 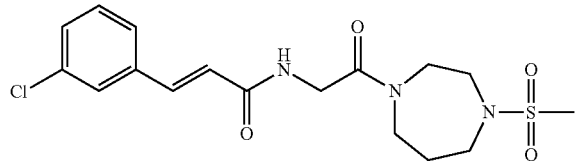 [SMILES: CS(=O)(=O)N1CCCN(C(=O)CNC(=O)/C=C/c2cccc(Cl)c2)CC1] |
| 7 | 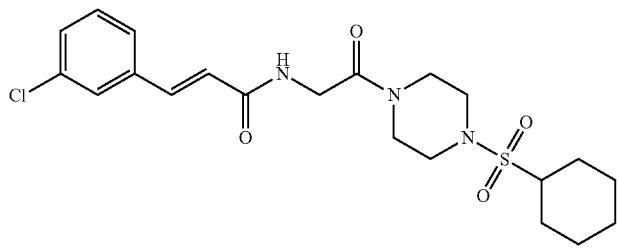 [SMILES: O=C(/C=C/c1cccc(Cl)c1)NCC(=O)N1CCN(S(=O)(=O)C2CCCCC2)CC1] |
| 8 | 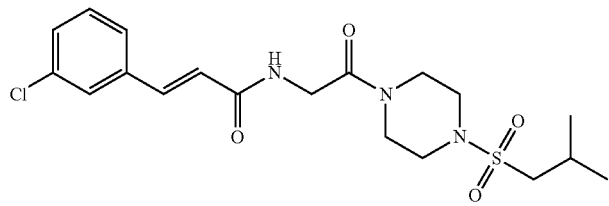 [SMILES: CC(C)CS(=O)(=O)N1CCN(C(=O)CNC(=O)/C=C/c2cccc(Cl)c2)CC1] |
| 9 | 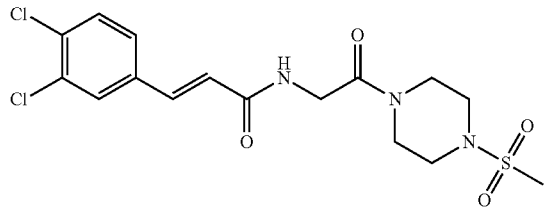 [SMILES: CS(=O)(=O)N1CCN(C(=O)CNC(=O)/C=C/c2ccc(Cl)c(Cl)c2)CC1] |
| 10 | 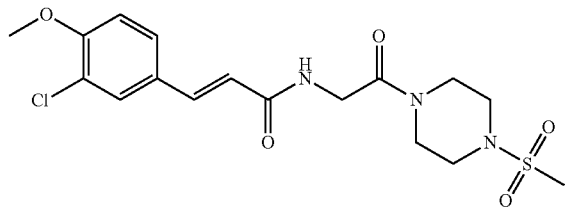 |
| 11 | 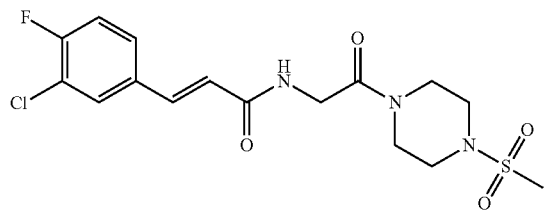 [SMILES: CS(=O)(=O)N1CCN(C(=O)CNC(=O)/C=C/c2ccc(F)c(Cl)c2)CC1] |
| 12 | 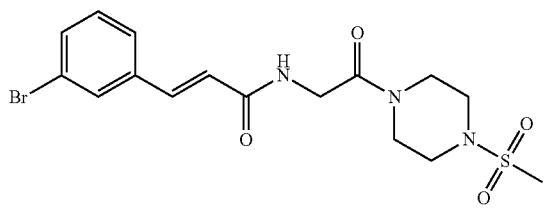 |

| Example | structure |
|---------|-----------|
| 13 | 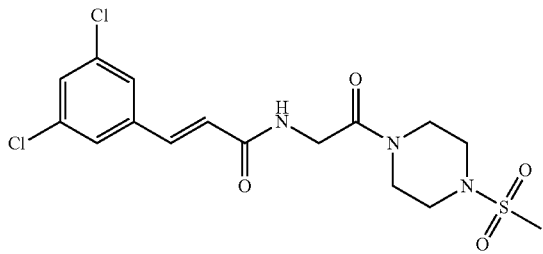 [SMILES: CS(=O)(=O)N1CCN(C(=O)CNC(=O)/C=C/c2cc(Cl)cc(Cl)c2)CC1] |
| 14 | 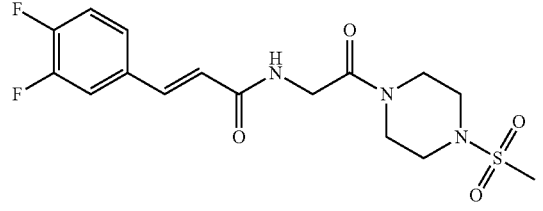 [SMILES: CS(=O)(=O)N1CCN(C(=O)CNC(=O)/C=C/c2ccc(F)c(F)c2)CC1] |
| 15 | 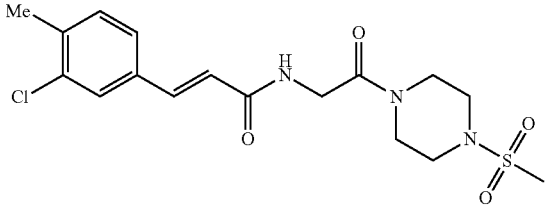 [SMILES: Cc1ccc(/C=C/C(=O)NCC(=O)N2CCN(S(C)(=O)=O)CC2)cc1Cl] |
| 16 | 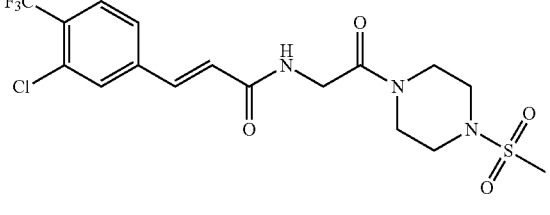 |
| 17 | 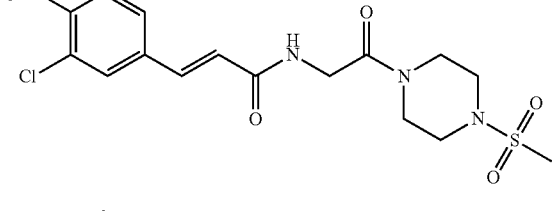 |
| 18 | 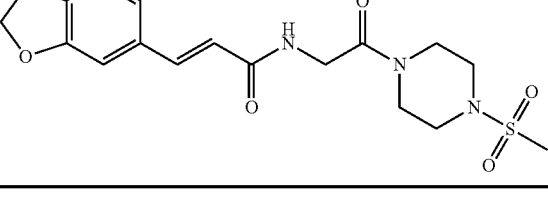 |

Pharmaceutical Composition

The disclosure also provides a pharmaceutical composition comprising a therapeutically effective amount of one or more compounds described herein, or a pharmaceutically acceptable salt, stereoisomer, and/or tautomer thereof in admixture with a pharmaceutically acceptable carrier. In some embodiments, the composition further contains, in accordance with accepted practices of pharmaceutical compounding, one or more additional therapeutic agents, pharmaceutically acceptable excipients, diluents, adjuvants, stabilizers, emulsifiers, preservatives, colorants, buffers, flavor imparting agents.

In one embodiment, the pharmaceutical composition comprises any enumerated compound described herein or a pharmaceutically acceptable salt, stereoisomer, and/or tautomer thereof, and a pharmaceutically acceptable carrier.

The pharmaceutical composition of the present disclosure is formulated, dosed, and administered in a fashion consistent with good medical practice. Factors for consideration in this context include the particular disorder being treated, the particular subject being treated, the clinical condition of the subject, the cause of the disorder, the site of delivery of the agent, the method of administration, the scheduling of administration, and other factors known to medical practitioners.

The "therapeutically effective amount" of a compound or a pharmaceutically acceptable salt, stereoisomer, and/or tautomer thereof that is administered is governed by such considerations, and is the minimum amount necessary to exert a therapeutic effect. Such amount may be below the amount that is toxic to normal cells, or the subject as a whole. Generally, the initial therapeutically effective amount of a compound (or a pharmaceutically acceptable salt, stereoisomer, or tautomer thereof) of the present disclosure that is administered is in the range of about 0.01 to about 200 mg/kg or about 0.1 to about 20 mg/kg of patient body weight per day, with the typical initial range being about 0.3 to about 15 mg/kg/day. Oral unit dosage forms, such as tablets and capsules, may contain from about 0.1 mg to about 1000 mg of a compound (or a pharmaceutically acceptable salt, stereoisomer, or tautomer thereof) of the present disclosure. In another embodiment, such dosage forms contain from about 50 mg to about 500 mg of a compound (or a pharmaceutically acceptable salt, stereoisomer, or tautomer thereof) of the present disclosure. In yet another embodiment, such dosage forms contain from about 25 mg to about 200 mg of a compound (or a pharmaceutically acceptable salt, stereoisomer, or tautomer thereof) of the present disclosure. In still another embodiment, such dosage forms contain from about 10 mg to about 100 mg of a compound (or a pharmaceutically acceptable salt, stereoisomer, or tautomer thereof) of the present disclosure. In a further embodiment, such dosage forms contain from about 5 mg to about 50 mg of a compound (or a pharmaceutically acceptable salt, stereoisomer, or tautomer thereof) of the present disclosure. In any of the foregoing embodiments the dosage form can be administered once a day or twice per day.

The compositions of the present disclosure can be administered orally, topically, parenterally, by inhalation or spray or rectally in dosage unit formulations. The term parenteral as used herein includes subcutaneous injections, intravenous, intramuscular, intrasternal injection or infusion techniques.

Suitable oral compositions as described herein include without limitation tablets, troches, lozenges, aqueous or oily suspensions, dispersible powders or granules, emulsion, hard or soft capsules, syrups or elixirs.

In another aspect, also encompassed are pharmaceutical compositions suitable for single unit dosages that comprise a compound of the disclosure or its pharmaceutically acceptable stereoisomer, salt, or tautomer and a pharmaceutically acceptable carrier.

The compositions of the present disclosure that are suitable for oral use may be prepared according to any method known to the art for the manufacture of pharmaceutical compositions. For instance, liquid formulations of the compounds of the present disclosure contain one or more agents selected from the group consisting of sweetening agents, flavoring agents, coloring agents and preserving agents in order to provide pharmaceutically palatable preparations of a compound of the present disclosure.

For tablet compositions, a compound of the present disclosure in admixture with non-toxic pharmaceutically acceptable excipients is used for the manufacture of tablets. Examples of such excipients include without limitation inert diluents, such as calcium carbonate, sodium carbonate, lactose, calcium phosphate or sodium phosphate; granulating and disintegrating agents, for example, corn starch, or alginic acid; binding agents, for example starch, gelatin or acacia, and lubricating agents, for example magnesium stearate, stearic acid or talc. The tablets may be uncoated or they may be coated by known coating techniques to delay disintegration and absorption in the gastrointestinal tract and thereby to provide a sustained therapeutic action over a desired time period. For example, a time delay material such as glyceryl monostearate or glyceryl distearate may be employed.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example peanut oil, liquid paraffin or olive oil.

For aqueous suspensions, a compound of the present disclosure is admixed with excipients suitable for maintaining a stable suspension. Examples of such excipients include without limitation are sodium carboxymethylcellulose, methylcellulose, hydroxypropylmethylcellulose, sodium alginate, polyvinylpyrrolidone, gum tragacanth and gum acacia.

Oral suspensions can also contain dispersing or wetting agents, such as naturally-occurring phosphatide, for example, lecithin, or condensation products of an alkylene oxide with fatty acids, for example polyoxyethylene stearate, or condensation products of ethylene oxide with long chain aliphatic alcohols, for example, heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyethylene sorbitan monooleate. The aqueous suspensions may also contain one or more preservatives, for example ethyl, or n-propyl p-hydroxybenzoate, one or more coloring agents, one or more flavoring agents, and one or more sweetening agents, such as sucrose or saccharin.

Oily suspensions may be formulated by suspending a compound of the present disclosure in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol.

Sweetening agents such as those set forth above, and flavoring agents may be added to provide palatable oral preparations. These compositions may be preserved by the addition of an anti-oxidant such as ascorbic acid.

Dispersible powders and granules suitable for preparation of an aqueous suspension by the addition of water provide a compound of the present disclosure in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

Pharmaceutical compositions of the present disclosure may also be in the form of oil-in-water emulsions. The oily phase may be a vegetable oil, for example olive oil or arachis oil, or a mineral oil, for example liquid paraffin or mixtures of these. Suitable emulsifying agents may be naturally-occurring gums, for example gum acacia or gum tragacanth, naturally-occurring phosphatides, for example soy bean, lecithin, and esters or partial esters derived from fatty acids and hexitol, anhydrides, for example sorbitan monoleate, and condensation reaction products of the said partial esters with ethylene oxide, for example polyoxyethylene sorbitan monoleate. The emulsions may also contain sweetening and flavoring agents.

Syrups and elixirs may be formulated with sweetening agents, for example glycerol, propylene glycol, sorbitol or sucrose. Such formulations may also contain a demulcent, a preservative, and flavoring and coloring agents. The pharmaceutical compositions may be in the form of a sterile injectable, an aqueous suspension or an oleaginous suspension. This suspension may be formulated according to the known art using those suitable dispersing or wetting agents and suspending agents which have been mentioned above. The sterile injectable preparation may also be sterile injectable solution or suspension in a non-toxic parentally acceptable diluent or solvent, for example as a solution in 1,3-butanediol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectables.

The compounds of the present disclosure may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials are cocoa butter and polyethylene glycols.

Compositions for parenteral administrations are administered in a sterile medium. Depending on the vehicle used and concentration the concentration of the drug in the formulation, the parenteral formulation can either be a suspension or a solution containing dissolved drug. Adjuvants such as local anesthetics, preservatives and buffering agents can also be added to parenteral compositions.

Methods of Use

As an exemplary formula (I) compound, SR18662 is active in the luciferase assay for KLF5 inhibition ($IC_{50}$=4.4 nM) as shown in Table 1 below. The compound is effective in MTT assays for blocking the growth of DLD-1, HCT-116, HT-29, and SW-620 colorectal cancer cell lines, with EC50 values ranging from 1.740 nM. The observed activity is greater than that previously seen for ML264.

TABLE 1

Comparison of ML264 and SR18662

| compound | luciferase $IC_{50}$ (nM) | $EC_{50}$ (nM) DLD-1 | $EC_{50}$ (nM) HCT-116 | $EC_{50}$ (nM) HT-29 | SW-620 |
|---|---|---|---|---|---|
| ML264 | 29 | 13 | 34 | 295 | 412 |
| SR18662 | 4.4 (6.5X) | 1.7 (7.6X) | 22 (1.55X) | 40 (7.3X) | 22 (18.7X) |

We have studied the effects of SR18662 upon lowering KLF5 levels in colon cancer cell lines. As was seen with both ML264 and SR15006, SR18662 significantly reduced KLF5 protein levels in DLD-1 cells by Western blot. The levels of the protein EGR-1 are lowered as well. In this experiment the test compounds were at 1 µM and 10 µM, and protein levels were measured after 24 h. Similar effects were seen at 48 h and at 72 h. The study was also repeated using HCT-116 cells rather than DLD-1 cells, with similar results. These compounds appear to dose-dependently reduce levels of KLF5 and EGR-1 proteins. This results in antitumor activity vs. cell types that abundantly express KLF5.

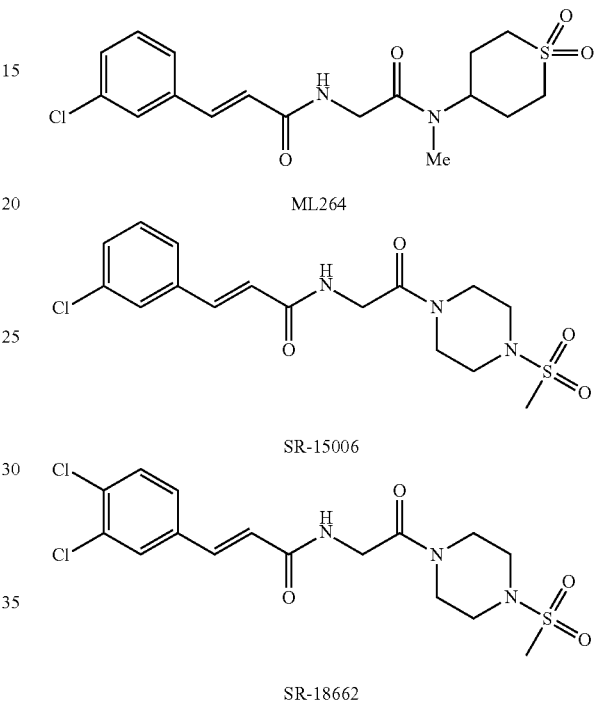

The design of SR18662. We previously described ML264 as a potent inhibitor of colorectal cancer growth in vitro and in vivo (24), showing that the growth of the CRCs and xenografts in nude mice were arrested upon treatment with ML264 in comparison to vehicle. We sought to perform further structure-activity relationship studies to further optimize ML264 with respect to anti-tumor activity and pharmacokinetic properties (FIG. 1A), focusing upon chemistry that would permit greater structural diversification. These efforts led to the discovery of SR15006 and SR18662 (FIG. 1A) and other analogs, which, while structurally related to ML264, are markedly different in the glycine amide region.

SR18662 is potent inhibitor of CRC cell growth in vitro. Firstly, to assess the effect of these compounds on the activity of the human KLF5 promoter, we used a DLD-1 CRC cell line stably transduced with the luciferase reporter gene under the control of the human KLF5 promoter (DLD-1/pGL4.18hKLF5p cell and (21)). Analysis of the results showed that SR18662 is very potent in this assay, with an $IC_{50}$=4.4 nM, while ML264 and SR15006 have $IC_{50}$ values of 43.9 nM and 41.6 nM, respectively (FIG. 1B). To examine the impact of these compounds on viability of CRC cell lines, we performed cell proliferation and cell growth assays using DLD-1 and HCT116 CRC cells. As shown in FIGS. 1C-F, the three compounds, each tested at 10 µM, significantly inhibited proliferation and growth of CRC cells over the course of three-day treatment in comparison to vehicle-treated cells. Additional analysis showed that SRI8662 demonstrated a robust inhibitory effect, not only in comparison with vehicle but also in comparison to ML264 and SR15006. To investigate if these compounds exhibit similar effect on other CRCs, we performed comparative cell viability analysis of four CRC cell lines (DLD-1, HCT116, HT29, and SW620) (FIGS. 2A-C). SR18662 showed the highest inhibitory effect on these CRC cell types as well, with an $IC_{50}$ value about one log unit lower than those for ML264 and SR15006.

SR18662 alters the cell cycle pattern of CRCs. Previously, we showed that ML264 can modify the cell cycle of CRC cells in comparison to vehicle (24). We have also evaluated the impact of SR15006 and SR18662 on cell cycle progression. We treated DLD-1 and HCT116 CRC cells over the course of three days with vehicle or 1 µM or 10 µM of test compound and then analyzed cell cycle using flow cytometry. As previously shown, treatment with 10 µM ML264 caused a significant decrease in the number of cells in G0/G1 and an increase in cells in S- and G2/M phases, both in DLD-1 and HCT116 cells, over three days (FIGS. 3A-F).

SR15006 treatment affected the cell cycle in the similar way as did ML264. SR18662 treatment, however, showed a different pattern (FIGS. 3A-F). There was a decrease in the number of cells in G0/G1 phase, however to a lower degree than had been observed following treatment with either ML264 or SR15006. Furthermore, in the case of SR18662 there was a significant increase in the number of cells within the subG1 population, in comparison to not only vehicle-treated cells but to cells treated with ML264 or SR15006. Very similar patterns of changes in the cell cycle were observed upon treatment of DLD-1 and HCT116 cells with 1 µM concentration of these compounds over three days. The increase in the number of cells in subG1 indicates that SR18662 can not only inhibit growth of CRCs and have cytostatic activity (as does ML264), but also that SR18662 can cause cell death and have cytotoxic potential.

We performed an apoptosis assay using DLD-1 and HCT116 cells treated with vehicle or 1 µM or 10 µM of test compounds over the course of three days with Annexin V/P1 stain in combination with FACS analysis. Our data showed that treatment of DLD-1 cells with 10 µM SR18662 caused a significant decrease in the population of healthy cells at 48 and 72 h in comparison to control, and also in comparison to treatment with 10 µM ML264 or SR15006 (FIGS. 4A-C). This is accompanied by an increase in the population of cells in early and late apoptosis, as well as an increase in the dead cell population over the three days of treatment. In addition, even treatment of DLD-1 cells with 1 µM SR18662 caused a decrease in healthy cell count at 48 h and 72 h and an increase in early and late apoptosis, as compared to vehicle- or ML264- or SR15006-treated cells. However, treatment of HCT116 with all three compounds decreased the population of healthy cells and gradually increased the population of cells in the early and late apoptosis (FIGS. 4D-F). This effect was more pronounced upon treatment with SR18662 than ML264 or SR15006 (FIGS. 4D-F). When a lower concentration (1 µM) of test compounds was used, only a small increase of the population of cells undergoing early apoptosis was seen after 72 h treatment with SRI8662. These data indicate that treatment with all three compounds alters the cell cycle of CRCs and that treatment with SR18662 can additionally induce cell apoptosis and death.

SR18662 negatively regulates MAPK and WNT signaling pathway and cyclin levels. Myriad publications have shown that in both in vitro and in vivo contexts KLF5 is regulated by MAPK and WNT signaling pathways and that KLF5, in turn, has the ability to modulate the activity of these pathways (14, 18, 26-32). We have previously shown that treatment of CRCs with ML264 results in decreased activity of both the MAPK and WNT signaling pathways (24). Because SR15006 and SRI8662 are structurally related to ML264, we decided to investigate their ability to alter the expression levels of the components of these pathways. Thus, we treated DLD-1 and HCT116 CRCs with DMSO (vehicle) and tested compounds at 1 µM or 10 µM, collecting the cells for western blot analysis at 24, 48, and 72 h. As shown on FIG. 5A, after 72 h of treatment, ML264, SR15006 and SR18662 all negatively regulated the expression levels of the components of the MAPK pathway. Treatment with these compounds decreased the basal levels of EGFR and ERK proteins and additionally altered their phosphorylation status. Importantly, KLF5 and its direct transcriptional activator EGR1 are significantly downregulated upon treatment with each of these compounds as compared to vehicle (14, 33). Similar effects were seen when both cell lines were treated these compounds at 1 µM. Furthermore, the inhibitory effects of SR18662 on the components of the MAPK signaling pathway we observed at earlier time points than were apparent following treatment with ML264 or SR15006.

Figure 5:
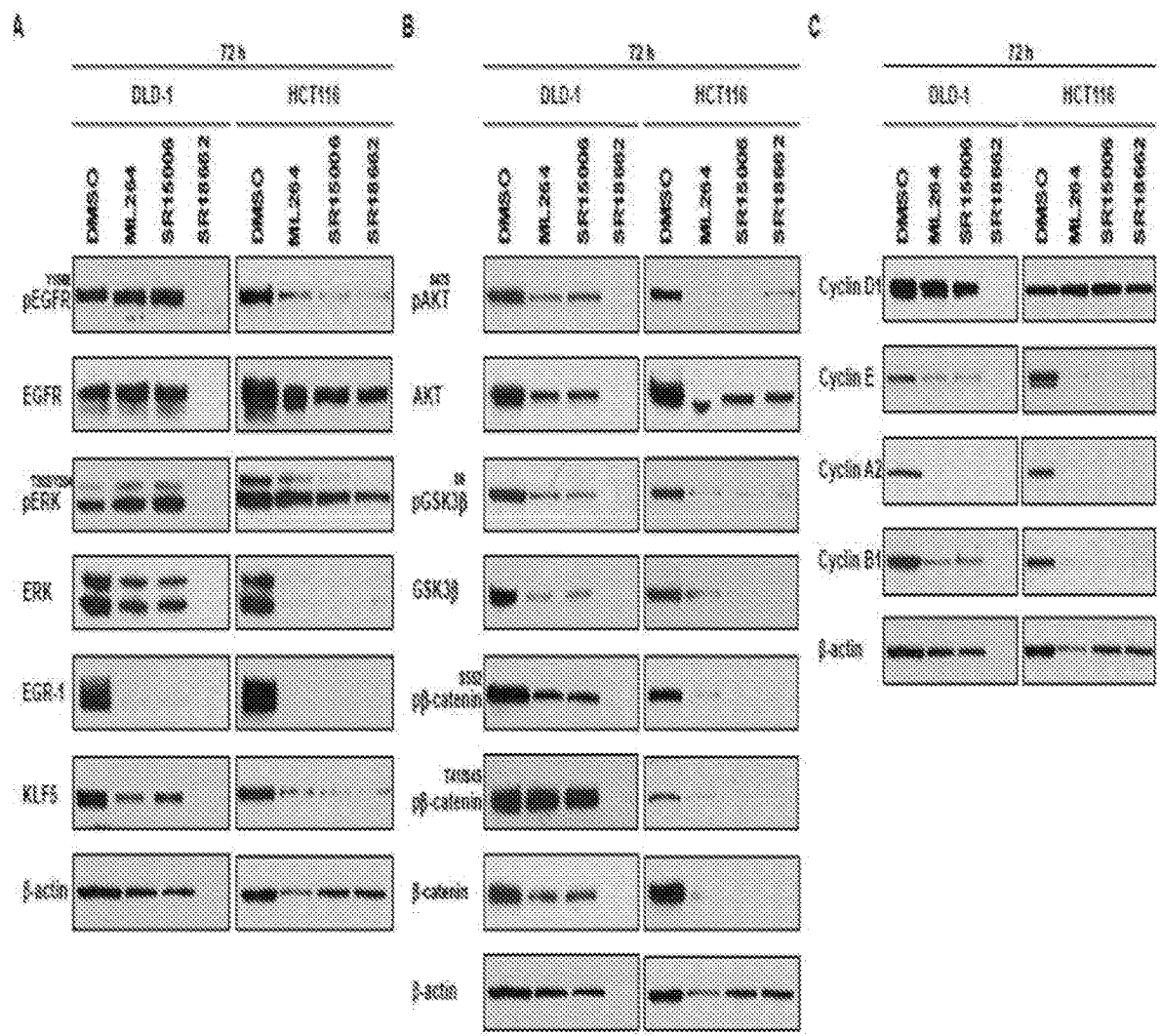
FIG. 5. SR18662 inhibits activity of MAPK, WNT/β-catenin signaling pathways and decreases the levels of cyclins. DLD-1 and HCT116 cells were treated with DMSO or 10 µM ML264, SR15006, or SR18662 for 72 h. Representative western blots of selected components of MAPK (A), WNT/β-catenin (B) signaling pathways and cyclins (C).

It was previously shown that WNT signaling regulates the expression of KLF5 (28, 29, 31, 34) and in turn that KLF5 can modulate the expression levels of 0-catenin, altering its nuclear accumulation and perturbing its transcriptional activity (30, 35). Thus, we examined the impact of tested compounds on the components of the WNT signaling pathway and observed a substantial reduction upon treatment (FIG. 5B). The treatment most notably results in a significant downregulation of AKT and its active form, phosphorylated at Serine 473 (36), which has the ability to phosphorylate and activate β-catenin (37). As shown in FIG. 5B, we observed not only a reduction in the expression levels of AKT but also of 0-catenin and active 0-catenin, which is phosphorylated at Serine 552 (38). The downregulation of the expression levels of the components of the WNT signaling pathway was also observed at 24 and 48 h. Moreover, the treatment with the compounds at 1 µM demonstrated a very similar pattern in inhibition of the WNT signaling pathway, with the effects most pronounced at 72 h.

Cyclins and their appropriate cyclin-dependent kinases form a regulatory network that allow cells to progress through the cell cycle (39, 40). The results presented in FIG. 3 demonstrate substantial changes in the cell cycle progression upon treatment with ML264. SR15006, or SR18662, as compared to vehicle-treated cells. Thus, we investigated if these changes are accompanied by differences in the expression levels of cyclins. We focused our attention on Cyclin D1, E, A2, and B1, as we have previously shown that ML264 has inhibitory effect on their levels (24). The treatment of DLD-1 and HCT116 CRC cells with 1 µM or 10 µM of ML264, SRI5006, or SR18862 caused significant reduction in the levels of tested cyclins over the course of 72 h (FIG. 5C). The reduced levels of cyclins E, A2, and B1 upon treatment with these compounds correlate with the reduction of the cells in G0/G1 and the accumulation of the cells within S and G2/M phases, as the lack of these cyclins does not allow cells to enter or exit these specific stages of the cell cycle. In an in vitro model, SRI8662 more effectively inhibits the proliferation of CRC cells. Additionally, in contrast to ML264 or SR15006, SR18862 induced apoptosis and cell death. Hence, we decided to investigate the ability of SR18862 to affect growth of tumor in a xenograft model.

Figure 6:
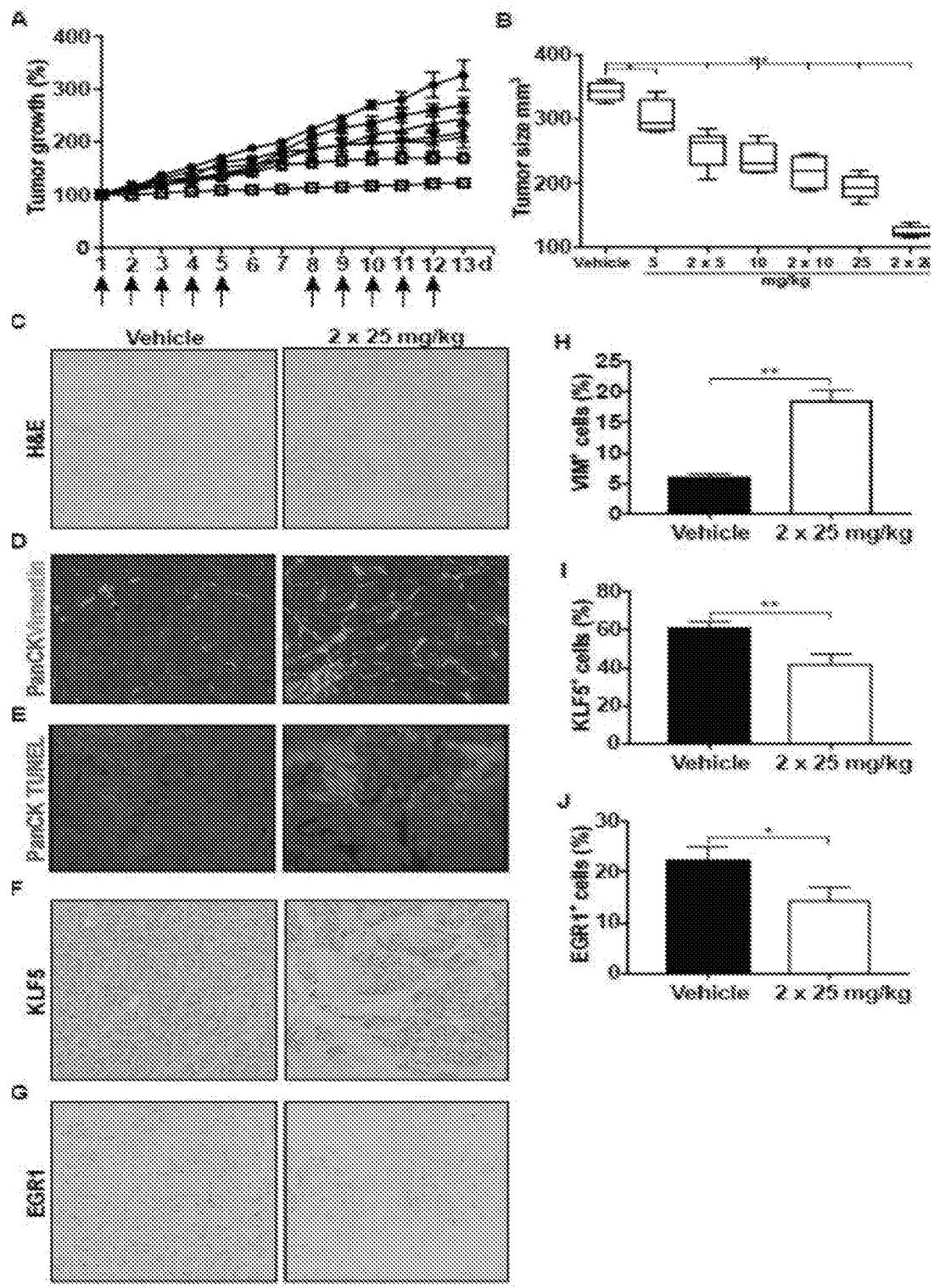
FIG. 6. SR18662 inhibits the growth of DLD-1-derived tumor xenografts in a nude mice model. DLD-1 cells were subcutaneously injected into nude mice to develop xenograft tumors. Mice were then treated with vehicle with various doses of SR18662. (A) Growth of the tumors after injection with vehicle (●), or with SR18662 at 5 (■), 2×5 (▲), 10 (▼), 2×10 (♦), 25 (○), and 2×25 (□) mg/kg. The arrows indicate the days of injections. Data represent mean f SEM (n=5). (B) Tumors sizes at the end of the treatment. Data represent mean±SEM (n=5). *p<0.05, ***p<0.001. (C-G) Representative images of DLD-1-derived xenografts treated with vehicle (left) and treated with SR18662 twice per day at 25 mg/kg (right). (C)—H&E, (D)—PanCK and Vimentin. (E)—PanCK and TUNEL, (F) KLF5-, and (G)—EGR1. Quantification of Vimentin positive staining (H), KLF5 positive staining (I), and EGR1 positive staining (J) of DLD-1-derived xenografts treated with vehicle (left) and treated with SR18662 twice per day at 25 mg/kg (right). Data represent mean±SEM (n=5). *p<0.05, **p<0.01.

SR18862 inhibits the growth of CRC xenografts in vivo. To evaluate SRI8662 in an in vivo model we used CRC cells for a mouse xenograft study. As described in more detail in the Examples section, nude mice were injected with DLD-1 CRC cells. Tumors were allowed to grow to an approximate size of 100 mm$^3$, and then mice were injected with vehicle or with varied concentrations of SR18662, given once a day or twice a day for five days, followed by two days without injection, and then followed by five days with injections. The experiment was completed the day after the last injection. As shown in FIG. 6A, we observed a dose-dependent reduction in tumor growth upon injection with SR18662, compared to vehicle-treated mice. Furthermore, tumor growth was significantly reduced after five days SR18662 treatment. Significant differences in tumor size are apparent at the end of the treatment schedule (FIG. 6B). To further characterize the impact of SR18662 on the features of isolated tumors, we compared vehicle-treated mice with mice that had been treated with SR18662 twice a day. The initial histological analysis by H&E stain showed an increase in the level of inflammation and fibrosis in xenografts that had been treated with SRI8662, in comparison to vehicle-treated xenografts (FIG. 6C). The PanCK/Vimentin stain confirmed a higher level of fibrosis in mice that had been treated with SR18662 (FIGS. 6D and 6H). Because SR18662 had induced cell apoptosis and death in the in vitro setting, we stained the xenografts with PanCK and TUNEL to estimate the levels of apoptosis in the in vivo context. As shown in FIG. 6E there is an increase of TUNEL staining in SR18662-treated xenografts in comparison to those that had been vehicle-treated.

ML264 and related compounds have been shown to inhibit the growth of CRCs and to decrease the levels of KLF5, a strong pro-proliferative transcription factor. We previously showed that ML264 inhibits the growth of CRC cells in vivo and reduces the levels of KLF5 and its direct transcriptional regulator EGR1. Hence, we decided to examine the levels of these proteins in xenografts treated with SR18662. Our immunohistochemistry analysis demonstrates that twice a day treatment with 25 mg/kg of SRI8662 significantly decreased the expression levels of KLF5 and EGR1, as compared to vehicle-treated mice (FIGS. 6F-G and 6I-J).

Many recent studies have demonstrated that KLF5 plays an important pro-proliferative role during tissue homeostasis and that under specific conditions KLF5 can become oncogenic and drive tumorigenesis (10-12, 18, 30, 41). We had previously shown that ML264, a small molecule discovered following an HTS campaign and follow-up SAR studies, has potent anti-colorectal cancer activity (23, 24).

Thus, in view of the results and data disclosed herein, the present disclosure provides in an embodiment a method of reducing an expression level of KLF5 or EGR-1 in a living cell. The method comprises contacting the cell with an effective amount of a compound as disclosed herein. The contacting can occur, per various embodiments, in vivo, in vitro, or ex vivo.

The present disclosure also provides in an embodiment a method of treatment of tumors in a patient, such as a mammal. Particularly vulnerable to compounds of the present disclosure are tumors that are comprised of KLF5-expressing cancer cells. The method comprises administering to the patient an effective dose of a compound as disclosed herein.

Also provided in an embodiment of the present disclosure is a method of treatment of colorectal cancer in a human patient. The method comprises administering to the patient an effective dose of a compound as disclosed herein.

The present disclosure provides, in various embodiments, a method of inhibiting the expression of transcription factors KLF5 and/or EGR-1, comprising contacting cells expressing one or both of these transcription factors with an effective amount or concentration of a compound of the present disclosure.

The present disclosure further provides, in various embodiments, a method of treatment of a condition in a mammal wherein treatment of the condition with a compound having an inhibitor effect on expression of KLF5, EGR-1, or both is medically indicated, comprising administering an effective amount of a compound of the present disclosure. For example, a compound of the present disclosure can show an antitumor effect. More specifically, the mammal can be a human patient.

In various embodiments, a method of treatment of a patient using an effective amount of a compound of the present disclosure can further comprise administering an effective amount of a standard-of-care therapeutic agent to the mammal. Administration can be carried out by an oral, intravenous, intranasal or transdermal method. In various embodiments, the condition is characterized by the heightened activity or by the high prevalence of KLF5 and/or EGR-1. Examples include colorectal cancer and prostate cancer. For instance, for a method of treatment of the present disclosure, the condition can be colorectal cancer or prostate cancer and the treatment can follow a determination of elevated KLF5 and/or EGR-1 expression levels in the tumor or tumors.

In various embodiments, the present disclosure provides a compound of the present disclosure for the treatment of a malignant tumor or tumors in humans.

EXAMPLES

Material and Methods

Cell lines and reagents. DLD-1, HCT116, HT29, and SW620 colorectal cancer cell lines were purchased from the American Type Culture Collection (ATCC). DLD-1 and SW620 cells were maintained in RPMI1640 medium supplemented with 10% FBS and 1% penicillin/streptomycin, while HCT116 and HT29 in McCoy's medium supplemented with 100% FBS and 1% penicillin/streptomycin. The DLD-1/pGL4.18hKLF5p cell line was maintained in RPMI1640 with 10% FBS and 1% penicillin/streptomycin supplemented with 800 µg/mL of geneticin (21). The cell lines were passaged for three months while used for experiments. We tested all cell lines for *Mycoplasma* contamination and routinely performed morphology checks on all tested cell lines. Furthermore, each experiment had appropriate controls to assure the behavior of tested cell lines and was performed with an appropriate number of biological replicates. The previously-described lead compound ML264 and subsequent new leads SR15006 and SR18662 were synthesized at The Scripps Research Institute in the laboratory of Dr. Thomas Bannister. For in vitro experiments the lead compounds were dissolved in dimethyl sulfoxide (DMSO, Fisher Scientific).

KLF5 promoter activity assay. DLD-1/pGL4.18hKLF5p cells were seeded in 96 well plate format and treated with DMSO or with test compounds dissolved in DMSO in the range of 0.001 to 20 µM final concentration for 24 h and the human KLF5 promoter activity was determined with the ONE-Glo luciferase assay system (Promega) using a SpectramMax M3 (Molecular Devices) plate reader. The $IC_{50}$ values were calculated using GraphPad Prism version 5.00 for Windows (GraphPad Software) (22).

Cell viability. DLD-1, HCT116, HT29, and SW620 cells were seeded in 96 well plate format and treated with DMSO or with compounds dissolved in DMSO in the range of 0.001 to 20 μM final concertation for 24 h and analyzed with the Cell Titer-Glo luciferase assay system (Promega) using a SpectraMax M3 (Molecular Devices) plate reader. The $IC_{50}$ values were calculated using GraphPad Prism version 5.00 for Windows (GraphPad Software).

Cell proliferation, cell cycle and apoptosis assays. For cell proliferation experiments, cell cycle, and apoptosis determination, DLD-1 and HCT116 cells were treated with 1 or 10 μM of each compound or with vehicle (DMSO). The cells were collected at 24, 48, and 72 h post-treatment and analyzed as previously described (24). Each experiment was performed in triplicate.

Western blot analysis. Total protein was extracted from cells with Laemmli buffer and the analysis was performed as described previously (24).

Immunofluorescence and immunohistochemistry. Tumors dissected from mice were first fixed in Bouin's fixative (50% ethanol+5% acetic acid in water) for 1 h, then fixed overnight in 10% buffered formalin (Fisher Scientific). The tissues were then paraffin-embedded using an automated processor, sectioned at 5 μm, collected onto charged slides and baked in a 65° C. oven overnight, and were subsequently deparaffinized in xylene. Sections were incubated in a 2% hydrogen peroxide in methanol bath to block endogenous tissue peroxidases and were then rehydrated by incubation in a decreasing ethanol bath series (100%, 95%, 70%) followed by antigen retrieval in citrate buffer solution (10 mM sodium citrate, 0.05% Tween-20, pH 6.0) at 120° C. for 10 min using a decloaking chamber (Biocare Medical).

Tissue sections were first incubated with blocking buffer (5% BSA in TBS-Tween) for 30 min at 37° C. and then with primary antibody at 4° C. overnight in a humidified chamber with gentle shaking. Sections were washed and incubated with secondary antibodies (HRP-conjugated or fluorescent-tagged) at the appropriate concentration for 30 min at 37° C. Betazoid DAB (Biocare Medical) was used to reveal IHC staining in tissues. For fluorescent sections, slides were washed after secondary antibody treatment and then stained with Hoechst (AnaSpec Inc.) and mounted with Prolong gold antifade (Life Technologies). Slides were analyzed under a Nikon Eclipse 90i microscope (Nikon) and representative photomicrographs were taken.

H&E stain. Five μm sections were fixed, paraffin-embedded, deparaffinized and rehydrated as discussed above. Then the sections were stained with Hematoxylin Stain Solution, Gill 3 (Ricca Chemical Company) and Eosin Y (Sigma-Aldrich), dehydrated in an increasing series of ethanol bath (70%, 95%, 100%), cleared in xylene and mounted with Cytoseal XYL xylene-based mounting media (Thermo Scientific). Images were taken using a Nikon Eclipse 90i microscope (Nikon).

TUNEL stain. Five μm sections of formalin-fixed, paraffin-embedded tissues were processed accordingly to manufacturer's protocol and stain with In Situ Cell Death Detection Kit, TMR Red (Sigma Aldrich).

Xenografts. All mice studies were approved by the Stony Brook University Institutional Animal Care and Use Committee (IACUC) and performed in accordance with institutional policies and NIH guidelines. Nude mice were purchased from Jackson Laboratories (Bar Harbor). Animals were housed under specific pathogen-free conditions in ventilated and filtered cages under positive pressure. DLD-1 human colorectal cells at concentration of $5 \times 10^6$ were subcutaneously injected into the right flank of 6-7 week old male nude mice. Tumor volume was determined by caliper measurement and calculated by the established method (25). When tumors reached a volume of about 100 mm$^3$, mice were treated intraperitoneally (i.p.) with varying doses of SR18662: 5 mg/kg daily, 5 mg/kg twice a day, 10 mg/kg daily, 10 mg/kg twice per day, 25 mg/kg daily, and 25 mg/kg twice per day. Each treatment regimen was as follows: 5 days injections, 2 days break, and 5 days of injections, and mice were collected 24 h after last injection. The vehicle solution (30% 2-hydroxypropyl-beta-cyclodextrin) was used as the control treatment. Mice were monitored and weighed every two days. Tumors were excised and retained for further analyses.

Statistical analysis. The analysis of significance of in vitro experiments was performed using a student's t-test, with a value of $p<0.05$ considered significant. This analysis was performed using GraphPad Prism version 5.00 for Windows (GraphPad Software). The analysis of tumor growth was performed using linear mixed effect model for longitudinal data was used to compare volume difference of each dose treatment versus vehicle after 5 days injections and after 10 days of injections. Mouse were selected at random for the various treatment schedules. Analysis was performed in SAS 9.4 (SAS Institute Inc.,) and significance level was set at 0.05.

Chemistry Methods

All reactions were performed in flame-dried glassware fitted with rubber septa under positive pressure of nitrogen or nitrogen, unless otherwise noted. Tetrahydrofuran, DMF, acetonitrile, and methylene chloride were purchased from Aldrich and used as received. Commercially available reagents were used without further purification. Thin layer chromatography (TLC) analyses were performed on pre-coated 250 μM silica 60 F254 glass-backed plates. Flash chromatography was performed on pre-packed columns of silica gel (230-400 mesh, 40-63 μm) by CombiFlash with EA/hexane or MeOH/DCM as eluents. Preparative HPLC was performed on a Shimadzu LC-8A preparative HPLC instrument on SunFire $C_{18}$ OBD 10 μm (30×250 mm) with $CH_3CN+50\%$ $MeOH/H_2O+0.1\%$ TFA as eluents to purify the targeted compounds. LC-MS was performed on Agilent Technologies 1200 series analytical HPLC instrument paired with a 6140 quadrupole mass spectrometer or with a Thermo Scientific UltiMate 3000 mass spectrometer. Analytical HPLC was performed on Agilent technologies 1200 series with $CH_3CN$ (Solvent B)/$H_2O+0.9\%$ $CH_3CN+0.1\%$ TFA (solvent A) as eluents, and the targeted products were detected by UV in the detection range of 215-310 nm. $^1H$ and $^{13}C$ NMR spectra were recorded on a Bruker NMR spectrometer at 400 MHz ($^1H$) or 100 MHz ($^{13}C$). Unless otherwise specified, $CDCl_3$ was used as the NMR solvent. Resonances were reported in parts per million downfield from TMS standard, and were referenced to either the residual solvent peak (typically $^1H$: $CHCl_3$ δ 7.27. $^{13}C$: $CDCl_3$ δ 77.23).

Methods of Synthesis. Compounds of the present disclosure can be made by general procedures illustrated by one example, described in Synthetic Scheme 2, below. This general route is used for all compounds in which X in formula (I) equals NH. In this case N—R$^3$—N equals a piperazine ring. Compounds with a variety of claimed R$^1$-R$^4$ groups can be made by very similar methods, well-understood by those of skill in the art.

Synthetic Scheme 2: General Scheme for Compounds of the Present Disclosure

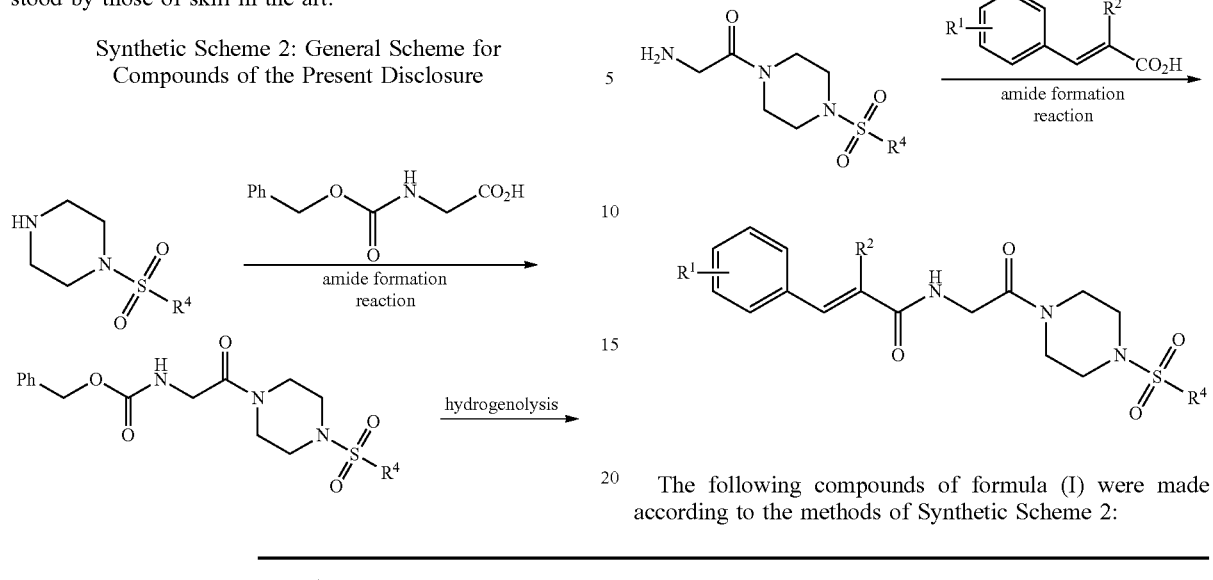

The following compounds of formula (I) were made according to the methods of Synthetic Scheme 2:

| Example | structure | name |
|---|---|---|
| 1 | | (E)-3-(3-chlorophenyl)-N-(2-(4-(methylsulfonyl)piperazin-1-yl)-2-oxoethyl)acrylamide, SR15006 |
| 2 | | (E)-3-(3-chlorophenyl)-N-(2-(4-(methylsulfonamidomethyl)piperidin-1-yl)-2-oxoethyl)acrylamide |
| 3 | | (E)-3-(3-chlorophenyl)-N-(2-(3-(methylsulfonamidomethyl)pyrrolidin-1-yl)-2-oxoethyl)acrylamide |
| 4 | | (E)-3-(3-chlorophenyl)-N-(2-(((1-(methylsulfonyl)piperidin-4-yl)methyl)amino)-2-oxoethyl)acrylamide |
| 5 | | (E)-3-(3-cholrophenyl)-N-(2-(((1-(methylsulfonyl)pyrrolidin-3-yl)methyl)amino)-2-oxoethyl)acrylamide |

-continued

| Example | structure | name |
|---|---|---|
| 6 | | (E)-3-(3-chlorophenyl)-N-(2-(4-(methylsulfonyl)-1,4-diazepan-1-yl)-2-oxoethyl)acrylamide |
| 7 | | (E)-3-(3-chlorophenyl)-N-(2-(4-(cyclohexylsulfonyl)piperazin-1-yl)-2-oxoethyl)acrylamide |
| 8 | | (E)-3-(3-chlorophenyl)-N-(2-(4-(isobutylsulfonyl)piperazin-1-yl)-2-oxoethyl)acrylamide |
| 9 | | (E)-3-(3,4-dichlorophenyl)-N-(2-(4-(methylsulfonyl)piperazin-1-yl)-2-oxoethyl)acrylamide (SR18662) |
| 10 | | (E)-3-(3-chloro-4-methoxyphenyl)-N-(2-(4-(methylsulfonyl)piperazin-1-yl)-2-oxoethyl)acrylamide |
| 11 | | (E)-3-(3-chloro-4-fluorophenyl)-N-(2-(4-(methylsulfonyl)piperazin-1-yl)-2-oxoethyl)acrylamide |
| 12 | | (E)-3-(3-bromophenyl)-N-(2-(4-(methylsulfonyl)piperazin-1-yl)-2-oxoethyl)acrylamide |

-continued

| Example | structure | name |
|---|---|---|
| 13 | | (E)-3-(3,5-dichlorophenyl)-N-(2-(4-(methylsulfonyl)piperazin-1-yl)-2-oxoethyl)acrylamide |
| 14 | | (E)-3-(3,4-difluorophenyl)-N-(2-(4-(methylsulfonyl)piperazin-1-yl)-2-oxoethyl)acrylamide |
| 15 | | (E)-3-(3-chloro-4-methylphenyl)-N-(2-(4-(methyslulfonyl)piperazin-1-yl)-2-oxoethyl)acrylamide |
| 16 | | (E)-3-(3-chloro-4-(trifluoromethyl)phenyl)-N-(2-(4-(methylsulfonyl)piperazin-1-yl)-2-oxoethyl)acrylamide |
| 17 | | (E)-3-(3-chloro-4-(trifluoromethoxy)phenyl)-N-(2-(4-(methylsulfonyl)piperazin-1-yl)-2-oxoethyl)acrylamide |
| 18 | | (E)-3-(benzo[d][1,3]dioxol-5-yl)-N-(2-(4-(methylsulfonyl)piperazin-1-yl)-2-oxoethyl)acrylamide |

Synthetic Procedures

Example 1. (E)-3-(3-chlorophenyl)-N-(2-(4-(methylsulfonyl)piperazin-1-yl)-2-oxoethyl)acrylamide

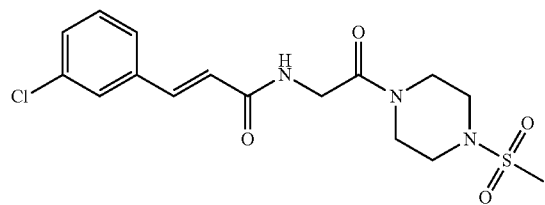 [SMILES: CS(=O)(=O)N1CCN(C(=O)CNC(=O)/C=C/c2cccc(Cl)c2)CC1]

Step 1

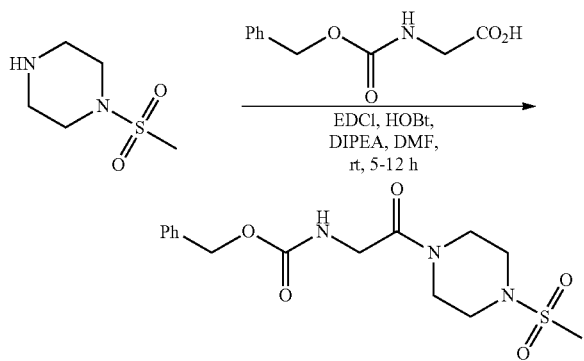

Step 1.1. A solution of 1-methylsulfonyl-piperazine (1.2 g, 7.3 mmol, 1.0 eq) and Cbz-Glycine (1.5 g, 7.3 mmol, 1 eq.) in DMF was treated with diisopropylethylamine (1.27 mL, 21.9 mmol, 3.0 eq.) at room temperature, stirred at r.t. around 10 min, then followed the addition of EDCI (1.25 g, 8.03 mmol, 1.1 eq) and HOBt (1.09, 8.03 mml, 1.1 eq) in one portion. The yellow solution was stirred at rt for 8 hours, then quenched with aq. sat, NH₄Cl, colorless solid was precipitate, filtrated it to get the colorless crude product which can be used to the next step without further purification. (2.2 g, 85%).

Step 2

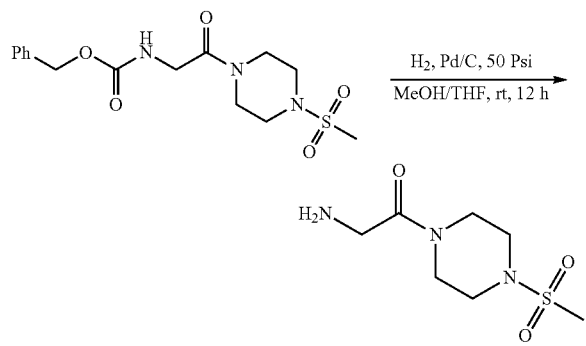

Step 1.2. A solution of 1 (2.2 g, 6.2 mmol) in MeOH/THF was treated with Pd/C (20%) under H₂ at 55 psi for 12 h. after reaction time, the mix was filtrated with celite and concentrated to give colorless solid as product which can be used the next step without further purification. (1 g, 74%).

Step 3

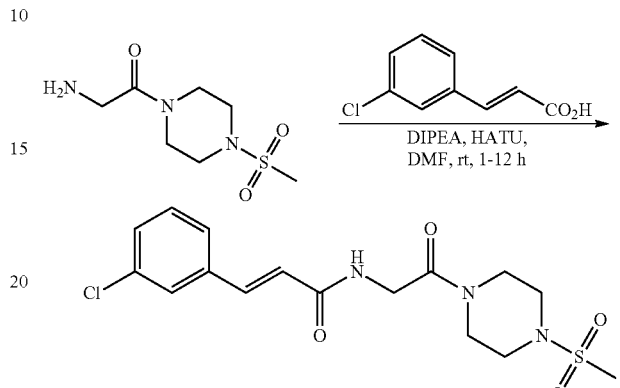

Step 1.3. A solution of 2 (30 mg, 0.14 mmol, 1.0 eq) and 3-chlorocinnamic acid (25 mg, 0.14 mmol, 1.0 eq.) in DMF was treated with diisopropylethylamine (71 uL, 0.42 mmol, 3.0 eq.) at room temperature, stirred at r.t. around 10 min, then followed the addition of HATU (54 mg, 0.143 mmol, 1.05 eq) in small portions. The bright yellow solution was stirred at rt for 8 hours, quenched with aq. sat, NH₄Cl, colorless solid was precipitate, filtrated it to get the colorless crude product (35 mg, 67%).

Data for product of Example 1: LC-MS(ESI): m/z 386 [M+1]$^+$; $^1$HNMR (400 Hz, CDCl₃) δ (ppm) 2.82 (s, 3H), 3.26-3.31 (dt, J=4.8 Hz, 4H), 3.59 (t, J=4.8 Hz, J=5.2 Hz, 2H), 3.80 (t, J=4.8 Hz, J=5.2 Hz, 2H), 4.20 (d, J=4.0 Hz, 2H), 6.50 (d, J=15.6 Hz, 1H), 6.73 (t, J=4.0 Hz, 1H), 7.29-7.40 (m, 3H), 7.51 (s, 1H), 7.57 (d, J=15.6 Hz, 1H). HPLC purity >95%

Example 2. (E)-3-(3-chlorophenyl)-N-(2-(4-(methylsulfonamidomethyl)piperidin-1-yl)-2-oxoethyl)acrylamide

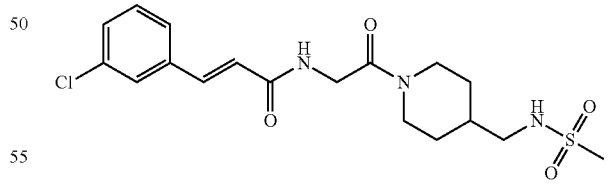

Prepared according to the general method, as shown in example 1. Data: LC-MS(ESI): m/z 386 [M+1]$^+$; $^1$HNMR (400 Hz, DMSO) δ (ppm) 0.93-1.01 (md, J=2.8 Hz, 1H), 1.02-1.15 (md, J=2.8 Hz, 1H), 1.64-1.78 (m, 3H), 2.58 (t, J=12.4 Hz, 1H), 2.83 (t, J=7 Hz, 2H), 2.88 (s, 3H), 3.00 (t, J=12.8 Hz, 1H), 3.83 (d, J=13 Hz, 1H), 4.09 (t, J=5.2 Hz, 2H), 4.34 (d, J=13 Hz, 1H), 6.93 (d, J=15.6 Hz, 1H), 7.04 (t, J=6.0 Hz, 1H), 7.42 (d, J=15.6 Hz, 1H), 7.42-7.47 (m, 2H), 7.54-7.56 (m, 1H), 7.67 (s, 1H), 8.14 (t, J=5.2 Hz, 1H) HPLC purity >95%.

Example 3. (E)-3-(3-chlorophenyl)-N-(2-(3-(methylsulfonamidomethyl)pyrrolidin-1-yl)-2-oxoethyl)acrylamide

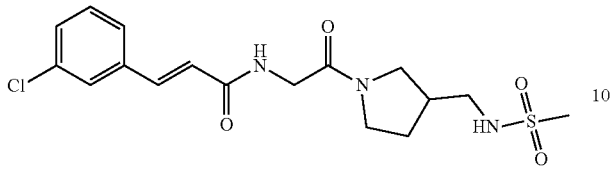

Prepared according to the general method, as shown in example 1.

Data: LC-MS(ESI): m/z 386 [M+1]⁺; ¹HNMR (400 Hz, MeOD) δ (ppm) 1.68-1.91 (dm, 1H), 2.03-2.20 (dm, 1H), 2.37-2.59 (dm, 1H), 2.95 (d, J=4.8 Hz, 3H), 3.06-3.24 (m, 3H), 3.33-3.47 (m, 1H), 3.52-3.72 (m, 2H), 4.12 (d, J=1.6 Hz, 2H), 6.76 (d, J=16.0 Hz, 1H), 7.37-7.39 (m, 2H), 7.54 (d, J=16.0 Hz, 1H), 7.62 (s, 1H). HPLC purity >95%.

Example 4. (E)-3-(3-chlorophenyl)-N-(2-(((1-(methylsulfonyl)piperidin-4-yl)methyl)amino)-2-oxoethyl)acrylamide

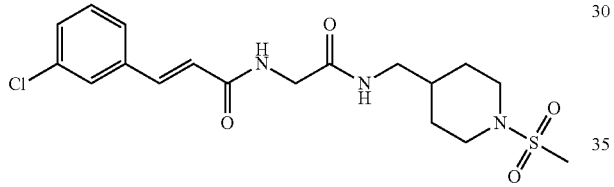

Prepared according to the general method, as shown in example 1.

Data: LC-MS(ESI): m/z 386 [M+1]⁺; ¹HNMR (400 Hz, DMSO) δ (ppm) 1.11-1.23 (m, 3H), 1.50-1.54 (m, 1H), 1.72 (dd, J=12.0 Hz, 2.4 Hz, 2H), 2.61-2.67 (t, J=12.0 Hz, 2.4 Hz, 2H), 2.83 (s, 3H), 3.01 (t, J=5.6 Hz, 2H), 3.53 (d, J=11.6 Hz, 2H), 3.82 (d, J=5.6 Hz, 2H), 6.82 (d, J=16.0 Hz, 1H), 7.40-7.47 (m, 2H), 7.44 (d, J=16.0 Hz, 1H), 7.53-7.57 (m, 1H), 7.65 (s, 1H), 8.00 (t, J=5.6 Hz, 1H), 8.31 (t, J=5.6 Hz, 1H). HPLC purity >95%.

Example 5. (E)-3-(3-chlorophenyl)-N-(2-(((1-(methylsulfonyl)pyrrolidin-3-yl)methyl)amino)-2-oxoethyl)acrylamide

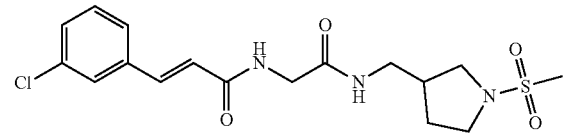

Prepared according to the general method, as shown in example 1.

Data: LC-MS(ESI): m/z 401 [M+1]⁺; ¹HNMR (400 Hz, DMSO) δ (ppm) 1.56-1.65 (m, 1H), 1.89-2.01 (m, 1H), 2.30-2.40 (m, 1H), 2.89 (s, 3H), 2.90-2.94 (dd, J=6.8 Hz, 1H), 3.08-3.14 (m, 2H), 3.17-3.21 (m, 1H), 3.23-3.30 (m, 2H), 3.82 (d, J=5.6 Hz, 2H), 6.80 (d, J=16.0 Hz, 1H), 7.30 (d, J=16.0 Hz, 1H), 7.44-7.47 (m, 2H), 7.54-7.56 (m, 1H), 7.65 (s, 1H), 8.08 (t, J=5.6 Hz, 1H), 8.34 (t, J=5.6 Hz, 1H). HPLC purity >95%.

Example 6. (E)-3-(3-chlorophenyl)-N-(2-(4-(methylsulfonyl)-1,4-diazepan-1-yl)-2-oxoethyl)acrylamide

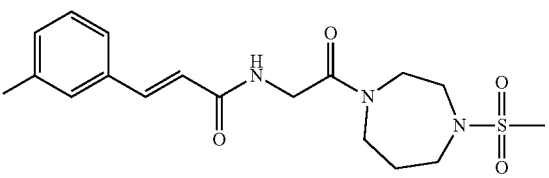

Prepared according to the general method, as shown in example 1.

Data: HRMS: m/z 400.1022 [M+1]⁺, calc 400.1020.

Example 7. (E)-3-(3-chlorophenyl)-N-(2-(4-(cyclohexylsulfonyl)piperazin-1-yl)-2-oxoethyl)acrylamide

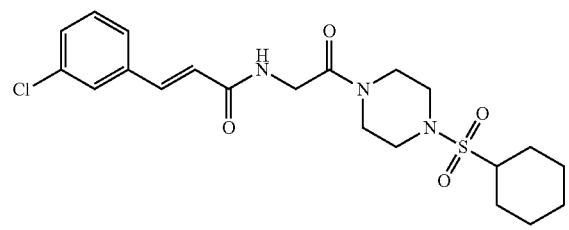 [SMILES: O=C(/C=C/c1cccc(Cl)c1)NCC(=O)N1CCN(S(=O)(=O)C2CCCCC2)CC1]

Prepared according to the general method, as shown in example 1.

Data: LC-MS(ESI): m/z 454 [M+1]⁺; ¹HNMR (400 Hz, CDCl₃) δ (ppm) 1.14-1.33 (m, 3H), 1.45-1.55 (qd, J=3.2 Hz, J=12 Hz, 2H), 1.72 (d, J=10.8 Hz, 1H), 1.90 (d, J=13.2 Hz, 2H), 2.10 (d, J=11.2 Hz, 2H), 2.88-2.96 (td, J=3.2 Hz, J=12 Hz, 1H), 3.38-3.43 (m, 4H), 3.53 (t, J=4.8 Hz, J=5.2 Hz, 2H), 3.74 (t, J=4.8 Hz, J=5.2 Hz, 2H), 4.21 (d, J=4.0 Hz, 2H), 6.51 (d, J=15.6 Hz, 1H), 6.78 (t, J=4.0 Hz, 1H), 7.29-7.34 (m, 2H), 7.37-7.40 (dt, J=2.0 Hz, J=6.8 Hz, 1H), 7.51 (s, 1H), 7.57 (d, J=15.6 Hz, 1H). HPLC purity 100%.

Example 8. (E)-3-(3-chlorophenyl)-N-(2-(4-(isobutylsulfonyl)piperazin-1-yl)-2-oxoethyl)acrylamide

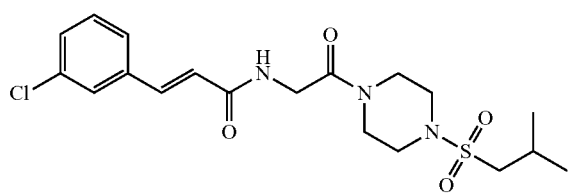 [SMILES: CC(C)CS(=O)(=O)N1CCN(C(=O)CNC(=O)/C=C/c2cccc(Cl)c2)CC1]

Prepared according to the general method, as shown in example 1.

Data: LC-MS(ESI): m/z 428 [M+1]⁺; ¹HNMR (400 Hz, CDCl₃) δ (ppm) 1.11 (d, J=6.8 Hz, 6H), 2.24-2.34 (m, 1H), 2.76 (d, J=6.8 Hz, 2H), 3.27-3.33 (dt, J=5.2 Hz, 4H), 3.56 (t, J=4.8 Hz, 2H), 3.77 (t, J=4.8 Hz, 2H), 4.22 (d, J=4.0 Hz, 2H), 6.51 (d, J=15.6 Hz, 1H), 6.77 (t, J=4.0 Hz, 1H), 7.29-7.35 (m, 3H), 7.51 (s, 1H), 7.57 (d, J=15.6 Hz, 1H). HPLC purity 85%.

Example 9. (E)-3-(3,4-dichlorophenyl)-N-(2-(4-(methylsulfonyl)piperazin-1-yl)-2-oxoethyl)acrylamide

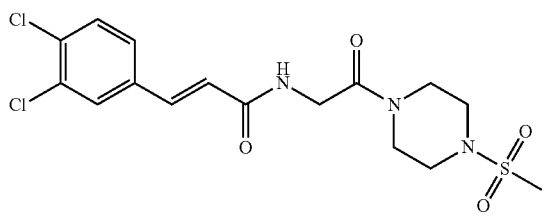

Prepared according to the general method, as shown in example 1.

Data: LC-MS(ESI): m/z 420 [M+1]+; 1HNMR (400 Hz, DMSO) δ (ppm) 2.90 (s, 3H), 3.11 (t, J=6.0 Hz, 2H), 3.16 (t, J=6.0 Hz, 2H), 3.57 (d, J=4.8 Hz, 4H), 4.13 (d, J=5.2 Hz, 2H), 6.94 (d, J=16.0 Hz, 1H), 7.42 (d, J=16.0 Hz, 1H), 7.59 (dt, J=2.0 Hz, J=8.4 Hz, 1H), 7.68 (d, J=8.4 Hz, 1H), 7.88 (d, J=2.0 Hz, 1H), 8.19 (t, J=5.2 Hz, 1H). HPLC purity >95%.

Example 10. (E)-3-(3-chloro-4-methoxyphenyl)-N-(2-(4-(methylsulfonyl)piperazin-1-yl)-2-oxoethyl) acrylamide

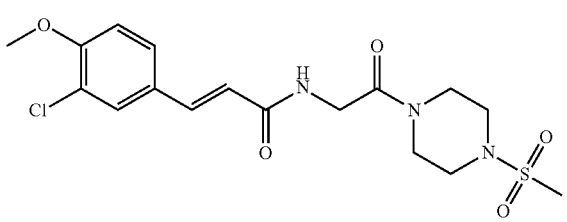

Prepared according to the general method, as shown in example 1.

Data: LC-MS(ESI): m/z 416 [M+1]+; 1HNMR (400 Hz, DMSO) δ (ppm) 2.90 (s, 3H), 3.11 (t, J=4.8 Hz, 2H), 3.16 (t, J=4.8 Hz, 2H), 3.57 (d, J=4.8 Hz, 4H), 3.89 (s, 3H), 4.12 (d, J=5.2 Hz, 2H), 6.78 (d, J=16.0 Hz, 1H), 7.19 (d, J=8.8 Hz, 1H), 7.36 (d, J=16.0 Hz, 1H), 7.55 (dt, J=2.0 Hz, J=8.8 Hz, 1H), 7.68 (d, J=2.0 Hz, 1H), 8.08 (t, J=5.2 Hz, 1H). HPLC purity >95%.

Example 11. (E)-3-(3-chloro-4-fluorophenyl)-N-(2-(4-(methylsulfonyl)piperazin-1-yl)-2-oxoethyl)acrylamide

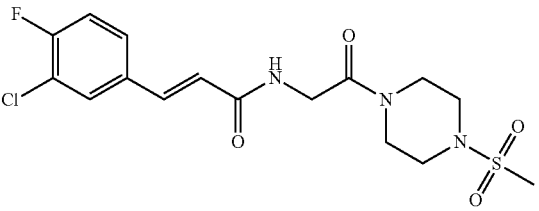 [SMILES: CS(=O)(=O)N1CCN(C(=O)CNC(=O)/C=C/c2ccc(Cl)c(Cl)c2)CC1]

Prepared according to the general method, as shown in example 1.

Data: LC-MS(ESI): m/z 404 [M+1]+; 1HNMR (400 Hz, CDCl3) δ (ppm) 2.82 (s, 3H), 3.26-3.33 (t, J=4.8 Hz, 4H), 3.59 (t, J=4.8 Hz, J=5.2 Hz, 2H), 3.8 (t, J=4.8 Hz, J=5.2 Hz, 2H), 3.42 (d, J=4.4 Hz, 2H), 6.43 (d, J=15.6 Hz, 1H), 6.71 (t, J=3.6 Hz, 1H), 7.15 (d, J=8.8 Hz, 1H), 7.36-7.40 (m, 1H), 7.55 (d, J=15.6 Hz, 1H), 7.68 (dd, J=2.0 Hz, 1H). HPLC purity >95%.

Example 12. (E)-3-(3-bromophenyl)-N-(2-(4-(methylsulfonyl)piperazin-1-yl)-2-oxoethyl)acrylamide

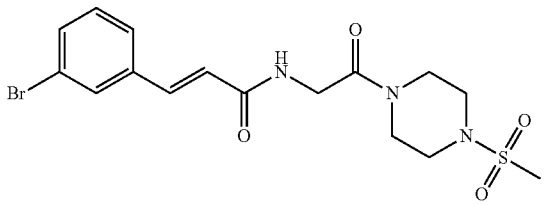

Prepared according to the general method, as shown in example 1.

Data: LC-MS(ESI): m/z 431 [M+1]+; 1HNMR (400 Hz, CDCl3) δ (ppm) 2.90 (s, 3H), 3.10 (t, J=4.8 Hz, 2H), 3.16 (t, J=4.8 Hz, 2H), 3.57 (t, J=4.4 Hz, 4H), 4.14 (d, J=5.6 Hz, 2H), 6.92 (d, J=16.0 Hz, 1H), 7.38 (t, J=8.0 Hz, 1H), 7.40 (d, J=16.0 Hz, 1H), 7.56-7.60 (m, 2H), 7.80 (t, J=1.6 Hz, 1H), 7.51 (t, J=5.6 Hz, 1H). HPLC purity >95%

Example 13. (E)-3-(3,5-dichlorophenyl)-N-(2-(4-(methylsulfonyl)piperazin-1-yl)-2-oxoethyl)acrylamide

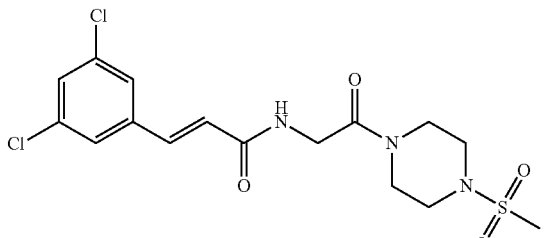

Prepared according to the general method, as shown in example 1.

Data: LC-MS(ESI): m/z 421 [M+1]+; 1HNMR (400 Hz, DMSO) δ (ppm) 2.90 (s, 3H), 3.10 (t, J=4.8 Hz, 2H), 3.16 (t, J=4.8 Hz, 2H), 3.57 (t, J=4.4 Hz, 4H), 4.14 (d, J=5.2 Hz, 2H), 7.00 (d, J=16.0 Hz, 1H), 7.40 (t, J=16.0 Hz, 1H), 7.61 (t, J=1.6 Hz, 1H), 7.67 (d, J=1.6 Hz, 2H), 8.14 (t, J=5.2 Hz, 1H). HPLC purity >90%.

Example 14. (E)-3-(3,4-difluorophenyl)-N-(2-(4-(methylsulfonyl)piperazin-1-yl)-2-oxoethyl)acrylamide

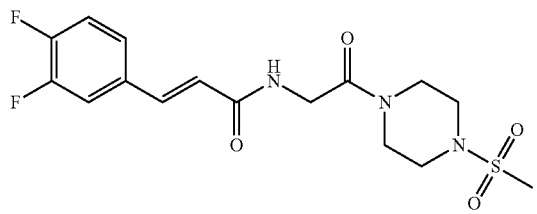 [SMILES: CS(=O)(=O)N1CCN(C(=O)CNC(=O)/C=C/c2ccc(F)c(F)c2)CC1]

Prepared according to the general method, as shown in example 1.

Data: LC-MS(ESI): m/z 388 [M+1]+; 1HNMR (400 Hz, CDCl3) δ (ppm) 2.82 (s, 3H), 3.26-3.31 (tt, J=5.2 Hz, 4H), 3.59 (t, J=4.8 Hz, 2H), 3.80 (t, J=5.2 Hz, 2H), 4.21 (d, J=4.0 Hz, 2H), 6.42 (d, J=15.6 Hz, 1H), 6.70 (t, J=4.0 Hz, 1H), 7.14-7.20 (tt, J=8.4 Hz, 1H), 7.20-7.24 (m, 1H), 7.31-7.36 (qt, J=2.0 Hz, J=7.6 Hz, 1H), 7.54 (d, J=15.6 Hz, 1H). HPLC purity >90%.

Example 15. (E)-3-(3-chloro-4-methylphenyl)-N-(2-(4-(methylsulfonyl)piperazin-1-yl)-2-oxoethyl)acrylamide

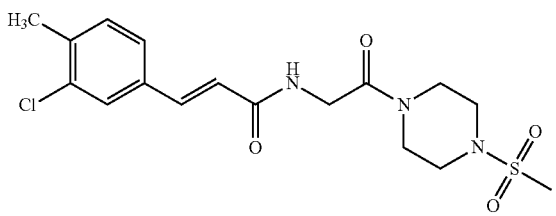

Prepared according to the general method, as shown in example 1.

Data: LC-MS(ESI): m/z 400 [M+1]+; 1HNMR (400 Hz, CDCl3) δ (ppm) 2.39 (s, 3H), 2.82 (s, 3H), 3.25-3.31 (tt, J=5.2 Hz, 4H), 3.59 (t, J=4.8 Hz, 2H), 3.80 (d, J=4.8 Hz, 2H), 4.21 (d, J=4.0 Hz, 2H), 6.46 (d, J=15.6 Hz, 1H), 6.71 (t, J=4.0 Hz, 1H), 7.22 (d, J=8.0 Hz, 1H), 7.30 (dd, J=1.6 Hz, J=8.0 Hz, 1H), 7.50 (d, J=1.6 Hz, 1H), 7.54 (d, J=15.6 Hz, 1H), HPLC purity >95%.

Example 16. (E)-3-(3-chloro-4-(trifluoromethyl)phenyl)-N-(2-(4-(methylsulfonyl)piperazin-1-yl)-2-oxoethyl)acrylamide

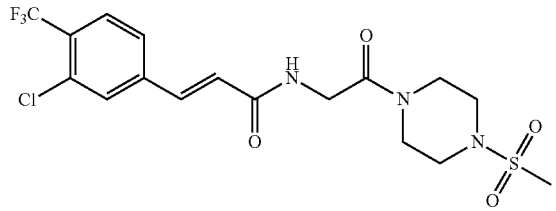 [SMILES: Cc1ccc(/C=C/C(=O)NCC(=O)N2CCN(S(C)(=O)=O)CC2)cc1Cl]

Prepared according to the general method, as shown in example 1.

Data: LC-MS(ESI): m/z 454 [M+1]+; 1HNMR (400 Hz, CDCl3) δ (ppm) 2.82 (s, 3H), 3.26-3.32 (tt, J=5.2 Hz, 4H), 3.59 (t, J=4.8 Hz, 2H), 3.80 (d, J=4.8 Hz, 2H), 4.22 (d, J=4.0 Hz, 2H), 6.53 (d, J=15.6 Hz, 1H), 6.80 (t, J=4.0 Hz, 1H), 7.47 (d, J=8.0 Hz, 1H), 7.58 (d, J=15.6 Hz, 1H), 7.64 (s, 1H), 7.70 (d, J=8.0 Hz, 1H), HPLC purity >95%.

Example 17. (E)-3-(3-chloro-4-(trifluoromethoxy)phenyl)-N-(2-(4-(methylsulfonyl)piperazin-1-yl)-2-oxoethyl)acrylamide

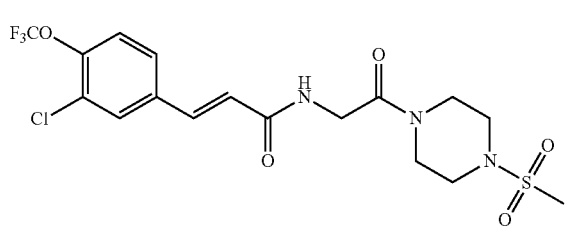 [SMILES: CS(=O)(=O)N1CCN(C(=O)CNC(=O)/C=C/c2ccc(OC(F)(F)F)c(Cl)c2)CC1]

Prepared according to the general method, as shown in example 1.

Data: LC-MS(ESI): m/z 470 [M+1]+; 1HNMR (400 Hz, CDCl3) δ (ppm) 2.82 (s, 3H), 3.26-3.32 (tt, J=5.2 Hz, 4H), 3.59 (t, J=4.8 Hz, 2H), 3.80 (d, J=4.8 Hz, 2H), 4.22 (d, J=4.0 Hz, 2H), 6.47 (d, J=15.6 Hz, 1H), 6.75 (t, J=4.0 Hz, 1H), 7.33 (d, J=1.2 Hz, J=8.4 Hz, 1H), 7.42 (d, J=2.0 Hz, J=8.4 Hz, 1H), 7.56 (d, J=15.6 Hz, 1H), 7.63 (t, J=2.0 Hz, 1H). HPLC purity >95%.

Example 18. (E)-3-(benzo[d][1,3]dioxol-5-yl)-N-(2-(4-(methylsulfonyl)piperazin-1-yl)-2-oxoethyl)acrylamide

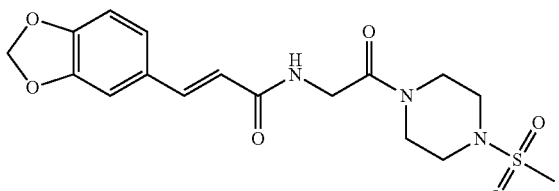

Prepared according to the general method, as shown in example 1.

Data: LC-MS(ESI): m/z 396[M+1]$^+$; $^1$HNMR (400 Hz, CDCl$_3$) δ (ppm) 2.82 (s, 3H), 3.25-3.31 (tt, J=5.2 Hz, 4H), 3.60 (t, J=4.8 Hz, 2H), 3.80 (t, J=4.8 Hz, 2H), 4.21 (d, J=4.0 Hz, 2H), 5.99 (s, 2H), 6.32 (d, J=15.6 Hz, 1H), 6.64 (t, J=4.0 Hz, 1H), 6.80 (t, J=8.0 Hz, 1H), 7.70 (d, J=1.6 Hz J=8.0 Hz, 1H), 7.02 (d, J=1.6 Hz, 1H), 7.56 (d, J=15.6 Hz, 1H). HPLC purity >95%.

Biological Activity

Example 19. Biological Activity of Selected Compounds of the Present Disclosure

Specific Examples of compounds of the present disclosure have EC$_{50}$ values estimated using a cell-based assay for binding to the KLF5 promoter and, in many cases, a follow-up viability assay (MTT) using DLD-1 colon cancer cells, a cell line known to highly express KLF5 and whose growth is adversely affected by the reduction of KLF5 levels. Assay protocols follow those described in the literature.[22,23] Other assays that are not described here but that are standard in the field may also be useful in establishing mechanism of action of these compounds. See Table 2, below.

TABLE 2

Biological activity of selected compounds of the present disclosure

| Example | ID | Approximate potency (EC$_{50}$ · mol/L) (luciferase) | Approximate potency (EC$_{50}$ · mol/L) (DLD1, MTT assay) |
| --- | --- | --- | --- |
| 1 | SR15006 | 4.16E−08 | 1.63E−08 |
| 2 | SR16358 | 1.41E−06 | 1.40E−07 |
| 3 | SR16360 | 8.46E−07 | 6.80E+01 |
| 4 | SR16357 | 8.23E−03 | 2.73E−06 |
| 5 | SR16359 | Not converged | 3.26E−09 |
| 6 | SR16361 | 1.08E−06 | 7.38E+02 |
| 7 | SR16439 | 1.28E−06 | 3.47E−07 |
| 8 | SR16438 | 7.05E−06 | 3.22E−07 |
| 9 | SR18662 | 4.40E−09 | 1.68E−09 |
| 10 | SR18664 | 1.70E−07 | 6.38E−08 |
| 11 | SR18670 | 2.61E−08 | 2.53E−08 |
| 12 | SR18665 | 8.78E−08 | 7.35E−08 |
| 13 | SR18671 | 1.08E−07 | 7.81E−08 |
| 14 | SR21157 | 4.61E−08 | 4.10E−08 |
| 15 | SR21237 | 6.28E−09 | 3.63E−09 |
| 16 | SR21177 | Not converged | 3.15E−07 |
| 17 | SR21137 | 7.91E−06 | 1.61E−06 |
| 18 | SR21197 | 2.01E−08 | 1.53E−08 |

NUMBERED DOCUMENTS CITED IN THE PRESENT DISCLOSURE

1. Siegel R L, Miller K D, Fedewa S A, Ahnen D J, Meester R G S, Barzi A, et al. Colorectal cancer statistics, 2017. C A Cancer J Clin. 2017; 67:177-93.
2. Wolpin B M, Mayer R J. Systemic treatment of colorectal cancer. Gastroenterology. 2008; 134:1296-310.
3. Gustavsson B, Carlsson G, Machover D, Petrelli N, Roth A, Schmoll H J, et al. A review of the evolution of systemic chemotherapy in the management of colorectal cancer. Clin Colorectal Cancer. 2015; 14:1-10.
4. Kalyan A, Kircher S, Shah H, Mulcahy M, Benson A. Updates on immunotherapy for colorectal cancer. J Gastrointest Oncol. 2018; 9:160-9.
5. Fearon E R. Molecular genetics of colorectal cancer. Annu Rev Pathol. 2011; 6:479-507.
6. Krishnamurthy N, Kurzrock R. Targeting the Wnt/beta-catenin pathway in cancer: Update on effectors and inhibitors. Cancer Treat Rev. 2018; 62:50-60.
7. Sun R, Chen X, Yang V W. Intestinal-enriched Kruppel-like factor (Kruppel-like factor 5) is a positive regulator of cellular proliferation. J Biol Chem. 2001; 276:6897-900.
8. Dong J T, Chen C. Essential role of KLF5 transcription factor in cell proliferation and differentiation and its implications for human diseases. Cell Mol Life Sci. 2009; 66:2691-706.
9. Suzuki T, Sawaki D, Aizawa K, Munemasa Y, Matsumura T, Ishida J, et al. Kruppel-like factor 5 shows proliferation-specific roles in vascular remodeling, direct stimulation of cell growth, and inhibition of apoptosis. J Biol Chem. 2009; 284:9549-57.
10. Ma D, Chang L Y, Zhao S, Zhao J J, Xiong Y J, Cao F Y, et al. KLF5 promotes cervical cancer proliferation, migration and invasion in a manner partly dependent on TNFRSF11a expression. Sci Rep. 2017; 7:15683.
11. Bell K N, Shroyer N F, Krupple-like factor 5 is required for proper maintenance of adult intestinal crypt cellular proliferation. Dig Dis Sci. 2015; 60:86-100.
12. Nandan M O, Ghaleb A M, Bialkowska A B, Yang V W. Kruppel-like factor 5 is essential for proliferation and survival of mouse intestinal epithelial stem cells. Stem Cell Res. 2015; 14:10-9.
13. Nakaya T, Ogawa S, Manabe I, Tanaka M, Sanada M, Sato T, et al. KLF5 regulates the integrity and oncogenicity of intestinal stem cells. Cancer Res. 2014; 74:2882-91.
14. Nandan M O, Yoon H S, Zhao W, Ouko L A, Chanchevalap S, Yang V W. Kruppel-like factor 5 mediates the transforming activity of oncogenic H-Ras. Oncogene. 2004; 23:3404-13.
15. Nandan M O, McConnell B B, Ghaleb A M, Bialkowska A B, Sheng H, Shao J, et al. Kruppel-like factor 5 mediates cellular transformation during oncogenic KRAS-induced intestinal tumorigenesis. Gastroenterology. 2008; 134:120-30.
16. Wei X, Ye J, Shang Y, Chen H, Liu S, Liu L, et al. Ascl2 activation by YAP1/KLF5 ensures the self-renewability of colon cancer progenitor cells. Oncotarget. 2017; 8:109301-18.
17. Nandan M O, Ghaleb A M, McConnell B B, Patel N V, Robine S, Yang V W. Kruppel-like factor 5 is a crucial mediator of intestinal tumorigenesis in mice harboring combined ApcMin and KRASV12 mutations. Mol Cancer. 2010; 9:63.
18. McConnell B B, Bialkowska A B, Nandan M O, Ghaleb A M, Gordon F J, Yang V W. Haploinsufficiency of Kruppel-like factor 5 rescues the tumor-initiating effect of the Apc(Min) mutation in the intestine. Cancer Res. 2009; 69:4125-33.
19. Nandan M O, Bialkowska A B, Yang V W. KLF5 mediates the hyper-proliferative phenotype of the intestinal epithelium in mice with intestine-specific endogenous K-Ras(G12D) expression. Am J Cancer Res. 2018; 8:723-31.
20. Zhang X, Choi P S, Francis J M, Gao G F, Campbell J D, Ramachandran A, et al. Somatic Superenhancer Duplications and Hotspot Mutations Lead to Oncogenic Activation of the KLF5 Transcription Factor. Cancer Discov. 2018; 8:108-25.
21. Bialkowska A B, Du Y, Fu H, Yang V W. Identification of novel small-molecule compounds that inhibit the pro-proliferative Kruppel-like factor 5 in colorectal cancer cells by high-throughput screening. Mol Cancer Ther. 2009; 8:563-70.
22. Bialkowska A B, Crisp M, Bannister T, He Y, Chowdhuiy S, Schurer S, et al. Identification of small-molecule inhibitors of the colorectal cancer oncogene Kruppel-like factor 5 expression by ultrahigh-throughput screening. Mol Cancer Ther. 2011; 10:2043-51.
23. Bialkowska A, Crisp M, Madoux F, Spicer T, Knapinska A, Mercer B, et al. ML264; An Antitumor Agent that Potently and Selectively Inhibits Kruppel-like Factor Five (KLF5) Expression: A Probe for Studying Colon Cancer Development and Progression. Probe Reports from the NIH Molecular Libraries Program. Bethesda (Md.) 2010.
24. Ruiz de Sabando A, Wang C, He Y, Garcia-Barros M, Kim J, Shroyer K R, et al. ML264, A Novel Small-Molecule Compound That Potently Inhibits Growth of Colorectal Cancer. Mol Cancer Ther. 2016; 15:72-83.
25. Kim J H, Alfieri A A, Kim S H, Young C W. Potentiation of radiation effects on two murine tumors by lonidamine. Cancer Res. 1986; 46:1120-3.
26. Chanchevalap S, Nandan M O, McConnell B B, Charrier L, Merlin D, Katz J P, et al. Kruppel-like factor 5 is an important mediator for lipopolysaccharide-induced proinflammatory response in intestinal epithelial cells. Nucleic Acids Res. 2006; 34:1216-23.
27. Yang Y, Goldstein B G, Nakagawa H, Katz J P. Kruppel-like factor 5 activates MEK/ERK signaling via EGFR in primary squamous epithelial cells. FASEB J. 2007; 21:543-50.
28. Liu N, Li H, Li S, Shen M, Xiao N, Chen Y, et al. The Fbw7/human $CDCl_4$ tumor suppressor targets proliferative factor KLF5 for ubiquitination and degradation through multiple phosphodegron motifs. J Biol Chem. 2010; 285:18858-67.
29. Zhao D, Zheng H Q, Zhou Z, Chen C. The Fbw7 tumor suppressor targets KLF5 for ubiquitin-mediated degradation and suppresses breast cell proliferation. Cancer Res. 2010; 70:4728-38.
30. McConnell B B, Kim S S, Yu K, Ghaleb A M, Takeda N, Manabe I, et al. Kruppel-like factor 5 is important for maintenance of crypt architecture and barrier function in mouse intestine. Gastroenterology. 2011; 141:1302-13, 13 e1-6.
31. Bialkowska A B, Liu Y, Nandan M O, Yang V W. A colon cancer-derived mutant of Kruppel-like factor 5 (KLF5) is resistant to degradation by glycogen synthase kinase 3beta (GSK3beta) and the E3 ubiquitin ligase F-box and WD repeat domain-containing 7alpha (FBW7alpha). J Biol Chem. 2014; 289:5997-6005.
32. Zhang H, Bialkowska A, Rusovici R, Chanchevalap S, Shim H, Katz J P, et al. Lysophosphatidic acid facilitates proliferation of colon cancer cells via induction of Kruppel-like factor 5. J Biol Chem. 2007; 282:15541-9.
33. Kawai-Kowase K, Kurabayashi M, Hoshino Y, Ohyama Y, Nagai R. Transcriptional activation of the zinc finger transcription factor BTEB2 gene by Egr-1 through mitogen-activated protein kinase pathways in vascular smooth muscle cells. Circ Res. 1999; 85:787-95.
34. Ziemer L T, Pennica D, Levine A J. Identification of a mouse homolog of the human BTEB2 transcription factor as a beta-catenin-independent Wnt-1-responsive gene. Mol Cell Biol. 2001; 21:562-74.
35. Guo L, He P, No Y R, Yun C C. Kruppel-like factor 5 incorporates into the beta-catenin/TCF complex in response to LPA in colon cancer cells. Cell Signal. 2015; 27:961-8.
36. Bayascas J R, Alessi D R. Regulation of AktiPKB Ser473 phosphorylation. Mol Cell. 2005; 18:143-5.
37. Fang D, Hawke D, Zheng Y, Xia Y, Meisenhelder J, Nika H, et al. Phosphorylation of beta-catenin by AKT promotes beta-catenin transcriptional activity. J Biol Chem. 2007; 282:11221-9.
38. Wang J, Han L, Sinnett-Smith J, Han L L, Stevens J V, Rozengurt N, et al. Positive cross talk between protein kinase D and beta-catenin in intestinal epithelial cells: impact on beta-catenin nuclear localization and phosphorylation at Ser552. Am J Physiol Cell Physiol. 2016; 310:C542-57.
39. Johnson D G, Walker C L. Cyclins and cell cycle checkpoints. Annu Rev Pharmacol Toxicol. 1999; 39:295-312.
40. Otto T, Sicinski P. Cell cycle proteins as promising targets in cancer therapy. Nat Rev Cancer. 2017; 17:93-115.
41. Liu Y, Chidgey M, Yang V W, Bialkowska A B. Kruppel-like factor 5 is essential for maintenance of barrier function in mouse colon. Am J Physiol Gastrointest Liver Physiol. 2017; 313:G478-G91.
42. Ahmed D, Eide P W, Eilertsen I A, Danielsen S A, Eknaes M, Hektoen M, et al. Epigenetic and genetic features of 24 colon cancer cell lines. Oncogenesis. 2013; 2:e71.
43. Weeber F, Ooft S N, Dijkstra K K, Voest E E. Tumor Organoids as a Pre-clinical Cancer Model for Drug Discovery. Cell Chem Biol. 2017; 24:1092-100.
44. Xie Z, Jie Z, Wang G, Sun X, Tang P, Chen S, et al. TGF-beta synergizes with ML264 to block IL-1beta-induced matrix degradation mediated by Kruppel-like factor 5 in the nucleus pulposus. Biochim Biophys Acta Mol Basis Dis. 2018; 1864:579-89.
45. Chen Z, Wu Q, Ding Y, Zhou W, Liu R, Chen H, et al. YD277 Suppresses Triple-Negative Breast Cancer Partially Through Activating the Endoplasmic Reticulum Stress Pathway. Theranostics. 2017; 7:2339-49.

All patents and publications referred to herein are incorporated by reference herein to the same extent as if each individual publication was specifically and individually indicated to be incorporated by reference in its entirety.

We claim:

1. A compound of formula (I), or a pharmaceutically acceptable salt thereof:

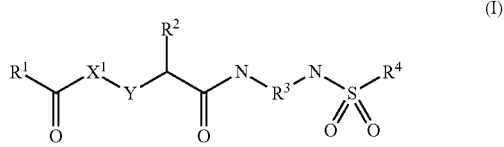

wherein
  $X^1$ is selected from the group consisting of NH, $CH_2$, CH-alkyl, and N-alkyl;
  Y is selected from the group consisting of $CH_2$, CH-alkyl, and a bond;
  $R^1$ is of formula

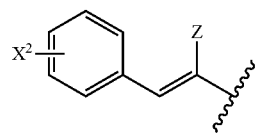

wherein
- $X^2$ is selected from the group consisting of H and 1-3 independent instances of Cl, Br, I, F, $SO_2NH_2$, $SO_2N(Me)_2$, $SO_2NH$-alkyl, $SO_2Me$, (C=O)$NH_2$, (C=O)$NMe_2$, (C=O)NH-alkyl, O-alkyl, and SMe;
- Z is selected from the group consisting of H, CN, $CF_3$, $SO_2Me$, $SO_2NH_2$, $SO_2NH$-alkyl, $SO_2N$(alkyl)$_2$, wherein the alkyl groups and the nitrogen atom to which they are bonded optionally form a ring further comprising 0 or 1 heteroatoms selected from the group consisting of O, S, NH, and N-alkyl, C(O)Me, $CO_2$-alkyl, C(O)—NH-alkyl, and C(O)N(Me)-alkyl;
- $R^2$ is selected from the group consisting of H, alkyl, and a side chain group of a natural amino acid;
- $R^3$ and the nitrogen atoms to which it is attached together comprise a cyclic or acyclic diamine of any one of the following formulae:

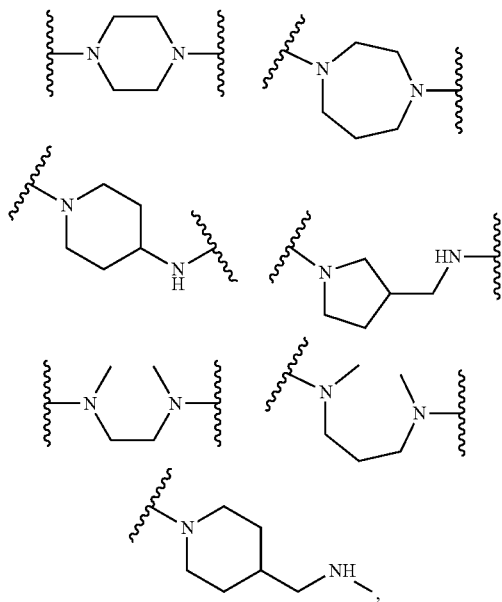

wherein a wavy line indicates a position of bonding; and,
$R^4$ is alkyl.

2. The compound of claim 1, or a pharmaceutically acceptable salt thereof, wherein
$X^1$ is NH or N-alkyl;
Y is $CH_2$ or is a bond;
$R^1$ is of formula

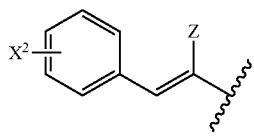

wherein
$X^2$ is selected from the group consisting of H and 1-2 independent instances of F, Cl, Br, $SO_2N(Me)_2$, $SO_2NHMe$, $SO_2NH$-alkyl, $SO_2Me$, (C=O)NHMe, (C=O)$NMe_2$, (C=O)NH-alkyl, and O-alkyl;

Z is selected from the group consisting of H, CN, $CF_3$, $SO_2Me$, $SO_2NH$-alkyl, $SO_2N$(alkyl)$_2$, wherein the alkyl groups and the nitrogen atom to which they are bonded optionally form a ring further comprising 0 or 1 heteroatoms selected from the group consisting of O, NH, and N-alkyl, C(O)Me, C(O)—NH-alkyl, and C(O)N(Me)-alkyl; and $R^3$ and the nitrogen atoms to which it is attached together comprise a cyclic diamine of any one of the following formulae:

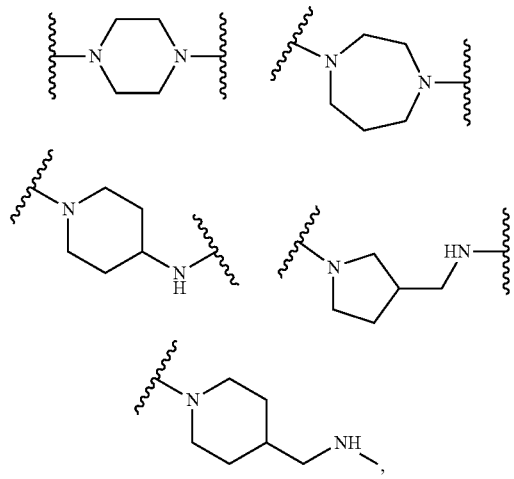

wherein a wavy line indicates a position of bonding.

3. The compound of claim 1, or a pharmaceutically acceptable salt thereof, wherein $X^1$ is NH.

4. The compound of claim 1, or a pharmaceutically acceptable salt thereof, wherein $X^1$ is NH and $R^2$ is H.

5. The compound of claim 1, or a pharmaceutically acceptable salt thereof, wherein $X^1$ is NH, $R^2$ is H, and the group N—$R^3$—N is a piperazine ring.

6. The compound of claim 1, or a pharmaceutically acceptable salt thereof, wherein $X^1$ is NH, $R^2$ is H, the group N—$R^3$—N is a piperazine ring, and $R^4$ is Me.

7. The compound of claim 1, or a pharmaceutically acceptable salt thereof, wherein $X^1$ is NH, $R^2$ is H, the group N—$R^3$—N is a piperazine ring, $R^4$ is Me, and $X^2$ is one or two instances selected from the group consisting of F, Cl, and $SO_2Me$.

8. A compound, or a pharmaceutically acceptable salt thereof, selected from the following table:

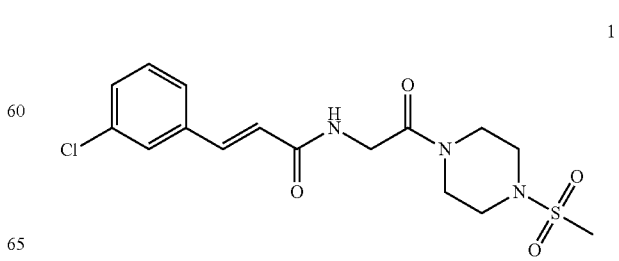

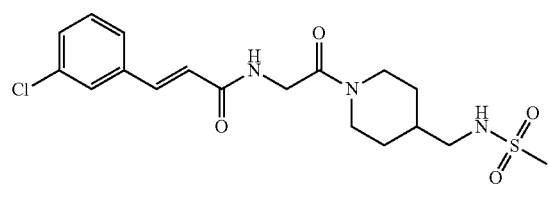 [SMILES: CS(=O)(=O)NCC1CCN(C(=O)CNC(=O)/C=C/c2cccc(Cl)c2)CC1]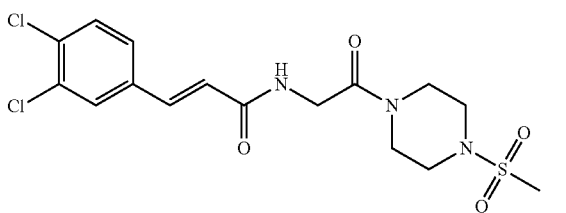 [SMILES: CS(=O)(=O)N1CCN(C(=O)CNC(=O)/C=C/c2ccc(Cl)c(Cl)c2)CC1]

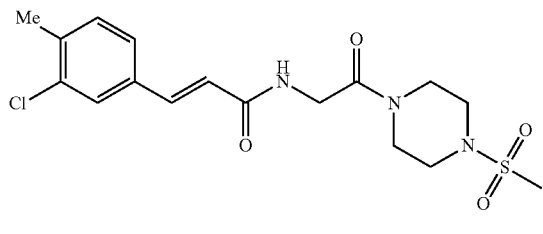

15

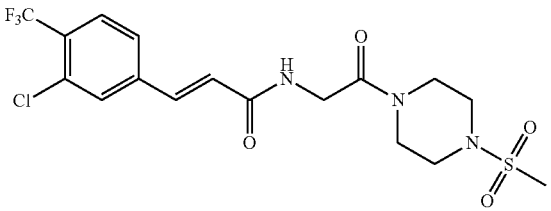 [SMILES: CS(=O)(=O)N1CCN(C(=O)CNC(=O)/C=C/c2ccc(C(F)(F)F)c(Cl)c2)CC1]

16

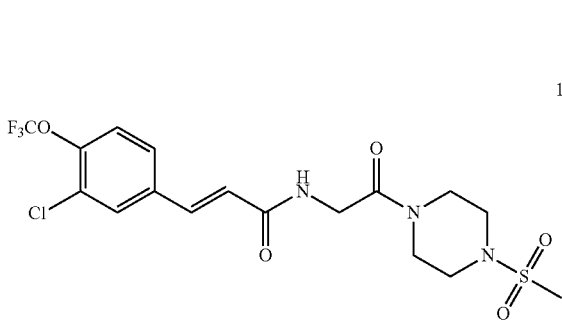

17

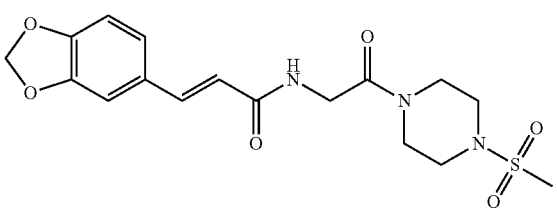 [SMILES: CS(=O)(=O)N1CCN(C(=O)CNC(=O)/C=C/c2ccc3c(c2)OCO3)CC1]

18

9. The compound of claim 1, or a pharmaceutically acceptable salt thereof, of formula (9):

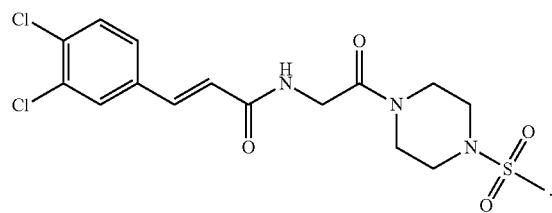

9

10. A method of reducing an expression level of KLF5 or EGR-1 in a living cell, comprising contacting the cell with an effective amount of a compound, or a pharmaceutically acceptable salt thereof, of claim 1.

11. A method of treatment of tumors in a patient that are comprised of KLF5-expressing cancer cells, comprising administering to the patient an effective dose of a compound, or a pharmaceutically acceptable salt thereof, of claim 1.

12. A method of treatment of colorectal cancer in a human patient, comprising administering to the patient an effective dose of a compound, or a pharmaceutically acceptable salt thereof, of claim 1.

13. A pharmaceutical composition comprising a compound, or a pharmaceutically acceptable salt thereof, of claim 1 and a pharmaceutically acceptable carrier.

14. A pharmaceutical composition comprising a compound, or a pharmaceutically acceptable salt thereof, of formula (9):

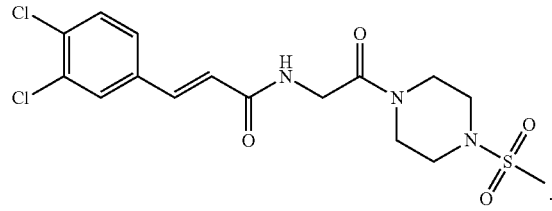

9

15. The compound of claim 1, or a pharmaceutically acceptable salt thereof, wherein $X^2$ is selected from the group consisting of H and 1-2 independent instances of F, Cl, Br, $SO_2N(Me)_2$, $SO_2NHMe$, $SO_2Me$, (C=O)NHMe, (C=O)$NMe_2$, and O-alkyl.

* * * * *